US005159349A

United States Patent [19]

Endo et al.

[11] Patent Number: 5,159,349

[45] Date of Patent: * Oct. 27, 1992

[54] RECORDING APPARATUS WHICH PROJECTS DROPLETS OF LIQUID THROUGH GENERATION OF BUBBLES IN A LIQUID FLOW PATH IN RESPONSE TO SIGNALS RECEIVED FROM A PHOTOSENSOR

[75] Inventors: Ichiro Endo, Yokohama; Yasushi Sato, Kawasaki; Seiji Saito, Yokohama; Takashi Nakagiri; Shigeru Ohno, both of Tokyo, all of Japan

[73] Assignee: Canon Kabushiki Kaisha, Tokyo, Japan

[ * ] Notice: The portion of the term of this patent subsequent to Jul. 18, 2006 has been disclaimed.

[21] Appl. No.: 769,751

[22] Filed: Oct. 3, 1991

Related U.S. Application Data

[60] Continuation of Ser. No. 564,585, Aug. 9, 1990, which is a division of Ser. No. 353,788, May 18, 1989, which is a division of Ser. No. 151,281, Feb. 1, 1988, Pat. No. 4,849,774, which is a division of Ser. No. 827,489, Feb. 6, 1986, Pat. No. 4,723,129, which is a continuation of Ser. No. 716,614, Mar. 28, 1985, which is a continuation of Ser. No. 262,604, May 11, 1981, which is a continuation of Ser. No. 948,236, Oct. 3, 1978, abandoned.

[30] Foreign Application Priority Data

| | | | |
|---|---|---|---|
| Oct. 3, 1977 | [JP] | Japan | 52-118798 |
| Oct. 19, 1977 | [JP] | Japan | 52-125406 |
| Aug. 18, 1978 | [JP] | Japan | 53-101188 |
| Aug. 18, 1978 | [JP] | Japan | 53-101189 |

[51] Int. Cl.$^5$ .......... B41J 2/05; H04N 1/034

[52] U.S. Cl. .......... 346/33 A; 346/140 R; 358/296

[58] Field of Search .......... 346/140, 33 A; 358/296

[56] References Cited

U.S. PATENT DOCUMENTS

| | | | |
|---|---|---|---|
| 3,655,379 | 4/1972 | Gundlach . | |
| 3,747,120 | 7/1973 | Stemme | 346/140 X |
| 3,790,703 | 2/1974 | Carley | 346/140 X |
| 3,893,126 | 7/1975 | Ascoli et al. . | |
| 4,723,129 | 2/1988 | Endo et al. | 346/1.1 |
| 4,740,796 | 4/1988 | Endo et al. | 346/1.1 |
| 4,849,774 | 7/1989 | Endo et al. | 346/140 R |

FOREIGN PATENT DOCUMENTS

| | | |
|---|---|---|
| 2164614 | 8/1972 | Fed. Rep. of Germany . |
| 2345748 | 3/1974 | Fed. Rep. of Germany . |
| 2615713 | 10/1976 | Fed. Rep. of Germany . |

*Primary Examiner*—Joseph W. Hartary
*Attorney, Agent, or Firm*—Fitzpatrick, Cella, Harper & Scinto

[57] ABSTRACT

A recording apparatus for recording an image sensed by a photosensor comprises an inlet for accepting a liquid to be delivered to an outlet orifice through a liquid flow path. Liquid is supplied to the inlet for flow through the liquid flow path to a heating element, which heats liquid in the liquid flow path in response to signals received by the photosensor. Heating is sufficient to cause a change of state of the liquid (that is, to generate a bubble) and produce a force acting on the liquid which overcomes the surface tension of liquid at the orifice and thereby projects a droplet of liquid from the orifice. The temperature of the heating element is raised at each actuation to a temperature above the maximum temperature at which the liquid in the liquid flow path is subjected only to nucleate boiling so as to promote substantially instantaneous transfer of heat to the liquid proximate to the heating element and to retard the transfer of heat from the heating element to liquid at other locations in the liquid flow path.

1 Claim, 12 Drawing Sheets

FIG.6
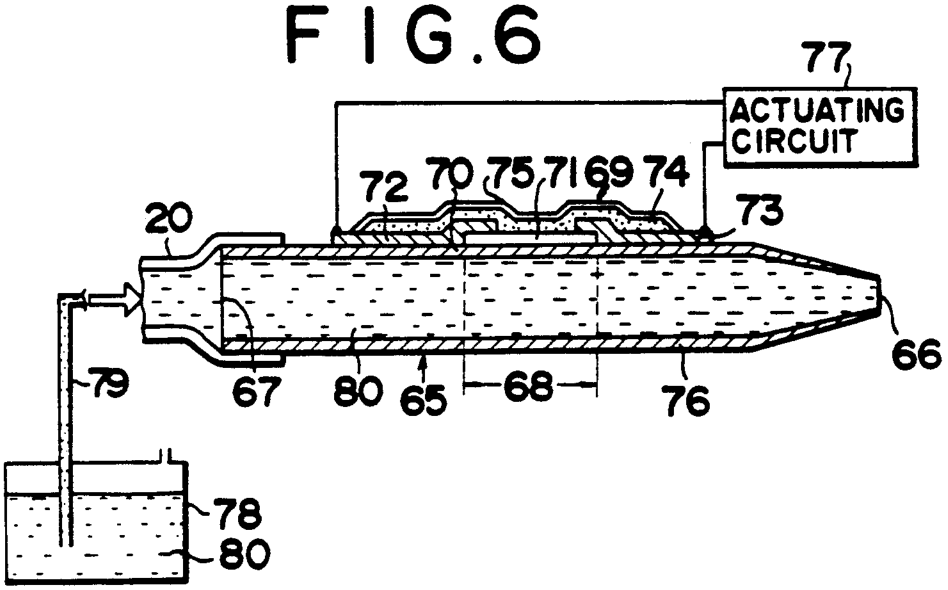
FIG.7
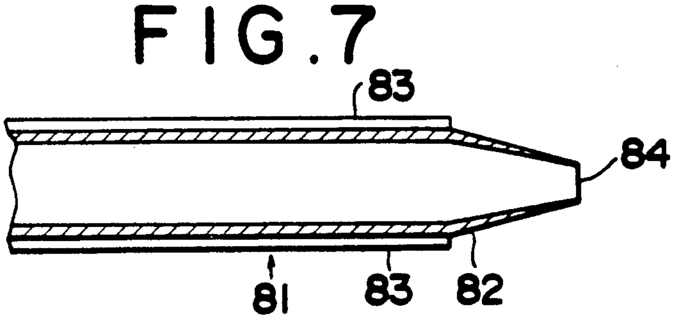
FIG.8a
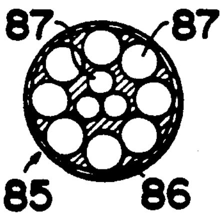
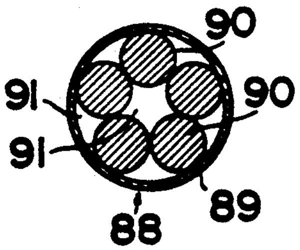
FIG.8b
FIG.8c
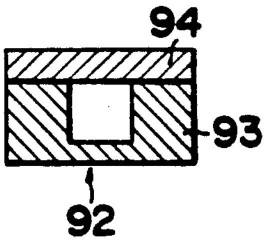

RECORDING APPARATUS WHICH PROJECTS DROPLETS OF LIQUID THROUGH GENERATION OF BUBBLES IN A LIQUID FLOW PATH IN RESPONSE TO SIGNALS RECEIVED FROM A PHOTOSENSOR

This application is a continuation of application Ser. No. 07/564,585 filed Aug. 9, 1990, now abandoned, which in turn is a division of application Ser. No. 07/353,788, filed May 18, 1989, which in turn is a division of application Ser. No. 07/151,281, filed Feb. 1, 1988, now U.S. Pat. No. 4,849,774, which in turn is a division of application Ser. No. 06/827,489, filed Feb. 6, 1986, now U.S. Pat. No. 4,723,129, which in turn is a continuation of U.S. application Ser. No. 06/716,614, filed Mar. 28, 1985, now abandoned, which in turn is a continuation of application Ser. No. 06/262,604, filed May 11, 1981, now abandoned, which in turn is a continuation of application Ser. No. 05/948,236, filed Oct. 3, 1978, now abandoned.

BACKGROUND OF THE INVENTION

1. Field of the Invention

The present invention relates to a liquid jet recording process and apparatus therefor, and more particularly to such process and apparatus in which a liquid recording medium is made to fly in a state of droplets.

2. Description of the Prior Art

So-called non-impact recording methods have recently attracted public attention because the noise caused by the recording can be reduced to a negligible order. Among these, particularly important is the so-called ink jet recording method allowing high-speed recording on a plain paper without particular fixing treatment, and in this field there have been proposed various approaches including those already commercialized and those still under development.

Such ink jet recording, in which droplets of a liquid recording medium, usually called ink, are made to fly and to be deposited on a recording member to achieve recording, can be classified into several processes according to the method of generating said droplets and also to the method of controlling the direction of flight of said droplets.

A first process is disclosed for example in the U.S. Pat. No. 3,060,429 (Teletype process) in which the liquid droplets are generated by electrostatic pull, and the droplets thus generated on demand are deposited onto a recording member with or without an electric-field control of the flight direction.

More specifically said electric-field control is achieved by applying an electric field between the liquid contained in a nozzle having an orifice and an accelerating electrode thereby causing said liquid to be emitted from said orifice and to fly between x-y deflecting electrodes so arranged as to be capable of controlling the electric field according to the recording signals, and thus selectively controlling the direction of flight of the droplets according to the change in the strength of the electric field to obtain deposition in desired positions.

A second process is disclosed for example in the U.S. Pat. No. 3,596,275 (Sweet process) and in the U.S. Pat. No. 3,298,030 (Lewis and Brown process) in which a flow of liquid droplets of controlled electrostatic charges is generated by continuous vibration and is made to fly between deflecting electrodes forming a uniform electric field therebetween to obtain a recording on a recording member.

More specifically, in this process, a charging electrode receiving recording signals is provided in front of and at a certain distance from the orifice of a nozzle constituting a part of a recording head equipped with a piezo vibrating element, and a pressurized liquid is supplied into said nozzle while an electric signal of a determined frequency is applied to said piezo vibrating element to cause mechanical vibration thereof, thereby causing the orifice to emit a flow of liquid droplets. As the emitted liquid is charged by electrostatic induction by the abovementioned charging electrode, each droplet is provided with a charge corresponding to the recording signal. The droplets having thus controlled charges are subjected to deflection corresponding to the amount of said charges during the flight in a uniform electric field between the deflecting electrodes in such a manner that only those carrying recording signals are deposited onto the recording member.

A third process is disclosed for example in the U.S. Pat. No. 3,416,153 (Hertz process) in which an electric field is applied between a nozzle and an annular charging electrode to generate a mist of liquid droplets by continuous vibration. In this process the strength of the electric field applied between the nozzle and the charging electrode is modulated according to the recording signals to control the dispersion of liquid thereby obtaining a gradation in the recorded image.

A fourth process, disclosed for example in the U.S. Pat. No. 3,747,120 (Stemme process), is based on a principle fundamentally different from that used in the foregoing three processes.

In contrast to said three processes in which the recording is achieved by electrically controlling the liquid droplets emitted from the nozzle during the flight thereof and thus selectively depositing only those carrying the recording signals onto the recording member, the Stemme process is featured in generating and flying the droplets only when they are required for recording.

More specifically, in this process, electric recording signals are applied to a piezo vibrating element provided in a recording head having a liquid-emitting orifice to convert said recording signals into mechanical vibration of said piezo element according to which the liquid droplets are emitted from said orifice and deposited onto a recording member.

The foregoing four processes, though being provided with respective advantages, are however associated with drawbacks which are inevitable or have to be prevented.

The foregoing first to third processes rely on electric energy for generating droplets or droplet flow of liquid recording medium, and also on an electric field for controlling the deflection of said droplets. For this reason the first process, though structurally simple, requires a high voltage for droplet generation and is not suitable for high-speed recording as a multi-orificed recording head is difficult to make.

The second process, though being suitable for high speed recording as the use of multi-orificed structure in the recording head is feasible, inevitably results in a structural complexity and is further associated with other drawbacks such as requiring a precise and difficult electric control for governing the flight direction of droplets and tending to result in formation of satellite dots on the recording element.

The third process, though advantageous in achieving recording of an improved gradation by dispersing the emitted droplets, is associated with drawbacks of difficulty in controlling the state of dispersion, presence of background fog in the recorded image and being unsuitable for high-speed recording because of difficulty in preparing a multi-orificed recording head.

In comparison with the foregoing three processes the fourth process is provided with relatively important advantages such as a simpler structure, absence of a liquid recovery system as the droplets are emitted on demand from the orifice of a nozzle in contrast to the foregoing three processes wherein the droplets which do not contribute to the recording have to be recovered, and a larger freedom in selecting the materials constituting the liquid recording medium not requiring electro-conductivity in contrast to the first and second processes wherein said medium has to be conductive. On the other hand said fourth process is again associated with drawbacks such as difficulty in obtaining a small head or a multi-orificed head because the mechanical working of a head is difficult and also because a small piezo vibrating element of a desired frequency is extremely difficult to obtain, and inadequacy for high-speed recording because the emission and flight of liquid droplets have to be performed by the mechanical vibrating energy of the piezo element.

As explained in the foregoing, the conventional processes respectively have advantages and drawbacks in connection with the structure, applicability for high-speed recording, preparation of recording head, particularly of a multi-orificed head, formation of satellite dots and formation of background fog, and their use has therefore been limited to the fields in which such advantages can be exploited.

SUMMARY OF THE INVENTION

The principal object of the present invention, therefore, is to provide a liquid jet recording process and an apparatus therefor enabling the use of a simple structure, easy preparation of multiple orifices and a high-speed recording, and providing a clear image without satellite dots or background fog.

Another object of the present invention is to provide a recording apparatus for recording an image sensed by a photosensor in which the apparatus comprises:

an orifice for projecting droplets of liquid;

an inlet for accepting liquid for delivery to said orifice;

a liquid flow path from said inlet to said orifice;

heating means for heating liquid in said liquid flow path in response to signals received by the photosensor to generate bubbles in said liquid flow path and project droplets of liquid from said orifice by raising the temperature of said heating means at each actuation thereof to a temperature above the maximum temperature at which the liquid in said liquid flow path is subjected only to nucleate boiling, wherein the liquid in said liquid flow path is heated so as to promote substantially instantaneous transfer of heat to the liquid in said liquid flow path substantially proximate to said heating means and to retard the transfer of heat from said heating means to liquid at other locations in said liquid flow path; and means for supplying liquid to said inlet and along said liquid flow path to a portion thereof where liquid is heated by said heating means.

BRIEF DESCRIPTION OF THE DRAWINGS

FIGS. 6 and 7 are schematic views showing representative examples of recording heads constituting a principal component in the present invention;

FIGS. 8(*a*), (*b*) and (*c*) are schematic cross-sectional views of nozzles of other preferred recording heads;

FIG. 11 to 14 are views of still another preferred embodiment of a multi-orificed recording head wherein FIG. 11 is a schematic perspective view, FIG. 12 is a schematic front view, FIG. 13 is a partial cross-sectional view along the line X1-Y1 in FIG. 11 for showing the internal structure and FIG. 14 is a partial cross-sectional view along the line X2-Y2 in FIG. 13;

DETAILED DESCRIPTION OF THE INVENTION

The liquid jet recording process of the present invention is advantageous in easily allowing high-density multi-orificed structure which permits ultra-high speed recording, providing a clear image of improved quality without satellite dots or background fog, and further allowing arbitrary control of the quantity of projected liquid as well as the dimension of droplets through the control of thermal energy to be applied per unit time. Also the apparatus embodying the above-mentioned process is characterized in an extremely simple structure easily allowing minute working and thus permitting significant size reduction of the recording head itself constituting the essential part in the apparatus, also in the case of obtaining a high-density multi-orifice structure indispensable for high-speed recording based on said simple structure and easy mechanical working, and further in the freedom of designing the orifice array structure in any desired shape in preparing a multi-orificed head permitting easy obtainment of a recording head in a form of a full-line bar.

OUTLINE OF THE INVENTION

Figure 1:
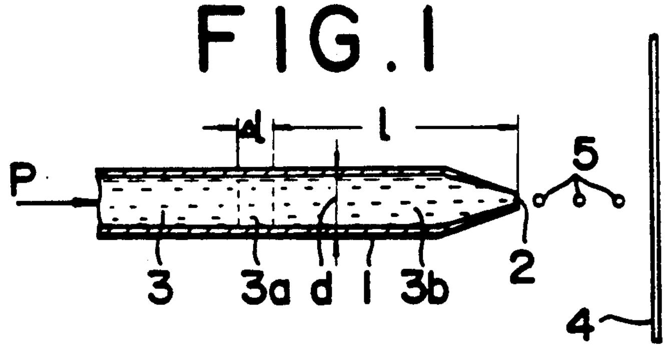
FIG. 1 is a schematic view showing the principle of the present invention.

The outline of the present invention will be explained in the following with reference to FIG. 1 which is an explanatory view showing the basic principle of the present invention.

In a nozzle 1 there is supplied a liquid 3 under a determined pressure P generated by a suitable pressurizing means such as a pump, said pressure being either enough for causing said liquid to be emitted from an orifice 2 against the surface tension of said liquid at said orifice or not enough for causing such emission. If thermal energy is applied to the liquid 3*a* present in a portion of a width Δl (thermal chamber portion) located in said nozzle 1 at a distance l from the orifice 2 thereof, a vigorous state change of said liquid 3*a* causes the liquid 3*b* contained in the width l of nozzle 1 to be projected partly or substantially entirely, according to the quantity of thermal energy applied, from said orifice 2 and to fly toward a record-receiving member 4 for deposition in a determined position thereon.

More specifically the liquid 3*a* present in said thermal chamber portion Δl, when subjected to thermal energy, causes an instantaneous state change of forming bubbles at a side thereof receiving said thermal energy, and the liquid 3*b* present in the width l is partly or substantially entirely projected from the orifice 2 by means of the force resulting from said state change. Upon termination of supply of thermal energy or upon immediate replenishment of liquid of an amount emitted, the bubbles formed in the liquid 3*a* are instantaneously reduced in size and vanish or contract to a negligible dimension.

The liquid of an amount corresponding to the emitted amount is replenished into the nozzle 1 by volumetric contraction of bubbles or by a forced pressure.

The dimension of droplets 5 projected from the orifice 2 depends on the quantity of thermal energy applied, width Δl of the portion 3*a* subjected to the thermal energy in the nozzle 1, internal diameter d of nozzle 1, distance l from the orifice 2 to the position of action of said thermal energy, pressure P of the liquid, and specific heat, thermal conductivity and thermal expansion coefficient of the liquid. It is therefore easily possible to control the dimension of the droplets 5 by changing one or two of these factors and thus to obtain a desired diameter of droplet or spot on the record-receiving member 4. Particularly a change in distance l, namely in the position of action of thermal energy during the recording allows arbitrary control of the size of droplets 5 projected from the orifice 2 without altering the quantity of thermal energy applied per unit time, thereby allowing easy obtainment of an image with gradation.

According to the present invention, the thermal energy to be applied to the liquid 3*a* present in the thermal chamber portion Δl of the nozzle 1 may either be continuous in time or be intermittent pulsewise.

In case of pulsewise application it is extremely easy to control the size of droplets and the number thereof generated per unit time through suitable selection of the frequency, amplitude and width of pulses.

Also in case of energy application discontinuous in time, the thermal energy to be applied may be modulated with the information to be recorded. Namely by applying thermal energy pulsewise according to the recording information signals it is rendered possible to cause all the droplets 5 emitted from the orifice 2 to carry recording information and thus to achieve recording by depositing all such droplets onto the record-receiving member 4.

On the other hand, in case of discontinuous energy application without modulation by the recording information, the thermal energy is preferably applied repeatedly with a certain determined frequency.

The frequency in such case is suitably selected in consideration of the species and physical properties of the liquid to be employed, shape of nozzle, liquid volume contained in the nozzle, liquid supply speed into the nozzle, diameter of orifice, recording speed etc., and is generally selected within a range from 0.1 to 1000 KHz, preferably from 1 to 1000 KHz and most preferably from 2 to 500 KHz.

The pressure applied to the liquid 3 in this case may be selected either at a value causing emission of liquid 3 from the orifice 2 even in the absence of effect of said thermal energy, or at a value not causing such emission if without said thermal energy. In either case it is possible to cause projection of a succession of droplets of a desired diameter at a desired frequency by repeated volumetric changes resulting from bubble formation of the liquid 3*a* in the thermal chamber portion Δl under the effect of thermal energy or by a vibration resulting from repeated volumetric changes in thus formed bubbles.

The liquid droplets projected in the above-explained manner are subjected to control by electrostatic charge, electric field or air flow according to the recording information to achieve recording.

In case of thermal energy application that is continuous in time, the size of droplets and the number thereof generated per unit time are, as confirmed by the present inventors, principally determined by the amount of thermal energy applied per unit time, pressure P applied to the liquid present in the nozzle 1, specific heat, thermal expansion coefficient and thermal conductivity of said liquid and the energy required for causing the droplet to be projected from the orifice 2. It is therefore possible to control said size and number of droplets by controlling, among the above-mentioned factors, the amount of thermal energy per unit time and/or the pressure P.

In the present invention the thermal energy applied to the liquid 3 is generated by supplying a thermal transducer with a suitable energy. Said energy may be in any form as long as it is convertible to thermal energy, but preferably is in the form of electric energy in consideration of ease of supply, transmission and control, or in the form of energy from a laser in consideration of the advantages such as a high converting efficiency, possibility of concentrating a high energy into a small target area, potential for miniaturization and ease of supply, transmission and control.

In case of using electric energy the above-mentioned transducer is an electrothermal transducer which is provided, either in direct contact or via a material of a high thermal conductivity, on the internal or external wall of the thermal chamber portion Δl of the nozzle 1 in such a manner that the liquid *3a* can be effectively subjected to the thermal energy generated by said electrothermal transducer provided at least in a portion of the internal or external wall of said thermal chamber portion.

In case of using laser energy, the above-mentioned transducer may be the liquid 3 itself or may be another element provided on said nozzle 1.

For example a liquid 3 containing a material generating heat upon absorption of laser energy directly absorbs the laser energy to cause a state change by the resulting heat, thereby causing the projection of droplets from the nozzle 1. Also for example, a layer generating heat upon absorption of laser energy, if provided on the external surface of nozzle 1, transmits the heat generated by the laser energy through the nozzle 1 to the liquid 3, thereby causing a state change therein and thus projecting droplets from the nozzle 1.

The record-receiving member 4 adapted for use in the present invention can be any material ordinarily used in the technical field of the present invention.

Examples of such record-receiving member are paper, plastic sheet, metal sheet and laminated materials thereof, but particularly preferred is paper in consideration of recording properties, cost and handling. Such paper can be, for example, ordinary paper, pure paper, light-weight coated paper, coated paper, art paper etc.

DETAILED DESCRIPTION OF THE PREFERRED EMBODIMENTS

Now there will be given a detailed explanation on the preferred embodiments of the present invention, while making reference to the attached drawings.

Figure 2:
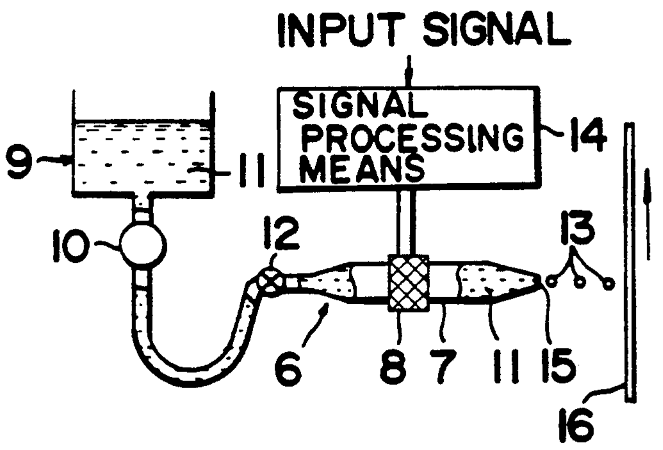
FIGS. 2 to 5 are schematic views showing preferred embodiments of the present invention.

Referring to FIG. 2 showing in a schematic view an embodiment suitable for droplet on-demand recording utilizing electric energy as the source of thermal energy, the recording head 6 is provided, at a fixed position on the nozzle 7, with an electrothermal transducer 8 such as a so-called thermal head encircling the thermal chamber portion. The nozzle 7 is supplied with a liquid recording medium 11 from a liquid reservoir 9 under a determined pressure through a pump 10 if necessary.

A valve 12 is provided to control the flow rate of liquid 11 or to block the flow thereof to the nozzle 7.

In the embodiment of FIG. 2 the electrothermal transducer 8 is provided at a determined distance from the front end of nozzle 7 and in intimate contact with the external wall thereof, and said contact can be made more effective by interposing a material of a high thermal conductivity therebetween or by preparing the nozzle itself with a material of a high thermal conductivity.

Though in said embodiment the electrothermal transducer 8 is fixedly mounted on the nozzle 7, it is also possible to suitably control the size of droplets of liquid 11 projected from the nozzle 7 by rendering said transducer displaceable on the nozzle 7 or by providing additional electrothermal transducers in other positions.

The recording in the embodiment shown in FIG. 2 is achieved by supplying recording information signals to a signal processing means 14 and converting said signals into pulse signals, and applying thus obtained pulse signals to the electrothermal transducer 8.

Upon receipt of said pulse signals corresponding to said recording information signals, the electrothermal transducer 8 instantaneously generates heat which is applied to the liquid 11 present in the thermal chamber portion coupled with said transducer 8. Under the effect of thermal energy the liquid 11 instantaneously undergoes a state change which causes the liquid 11 to be projected from an orifice 15 of the nozzle 7 in the form of droplets 13 and to be deposited on a record-receiving member 16.

The size of droplets 13 projected from said orifice 15 depends on the diameter of orifice 15, quantity of liquid present in the nozzle 7 and in front of the position of electrothermal transducer 8, physical properties of the liquid 11 and the magnitude of electric pulse signals.

Upon projection of droplets 13 from the orifice 15 of nozzle 7, the nozzle 7 is replenished, from the reservoir 9, with the liquid of an amount corresponding to the projected amount. In this case the time required for said replenishment has to be shorter than the interval between succeeding electric pulses.

After a part of substantially all of the liquid present from the position of electrothermal transducer 8 to the front end of nozzle 7 is emitted therefrom by a state change in said thermal chamber portion upon transmission of thermal energy from said transducer 8 to the liquid 11, and simultaneously with the instantaneous replenishment of liquid from the reservoir 9 through a pipe, the area in the vicinity of said electrothermal transducer 8 proceeds to resume the original thermal stationary state until a next electrical pulse signal is applied to the transducer 8.

In case the recording head 6 is composed of a single head as shown in FIG. 2, a scanning for recording can be achieved by selecting the displacing direction of the recording head 6 orthogonal to that of record-receiving member 16 in the plane thereof, and in this manner it is rendered possible to achieve recording on the entire surface of the record-receiving member 16. Further the recording speed can be increased by the use of multi-orificed structure in the recording head 6 as will be explained later, and the displacement of recording head 6 during the recording can be eliminated by the use of full-line bar structure in which a number of nozzles are arranged in a line over a width required for recording on the record-receiving member 16.

The electrothermal transducer 8 can be almost any transducers capable of converting electrical energy into thermal energy, but particularly suitable is a so-called thermal head which has recently been employed in the field of heat-sensitive recording.

Such electrothermal transducers are simply capable of generating heat upon receiving an electric current, but a more effective on-off function of thermal energy to the recording medium in response to the recording information signals can be expected by the use of electrothermal transducers showing so-called Peltier effect, namely capable of heat emission by a current in one direction and heat absorption by a current in the opposite direction.

Examples of such electrothermal transducers are a junction element of Bi and Sb, and a junction element of $(Bi.Sb)_2Te_3$ and $Bi_2(Te.Se)_3$.

Also effective as the electrothermal transducer is the combination of a thermal head and a Peltier effect element.

Figure 3:
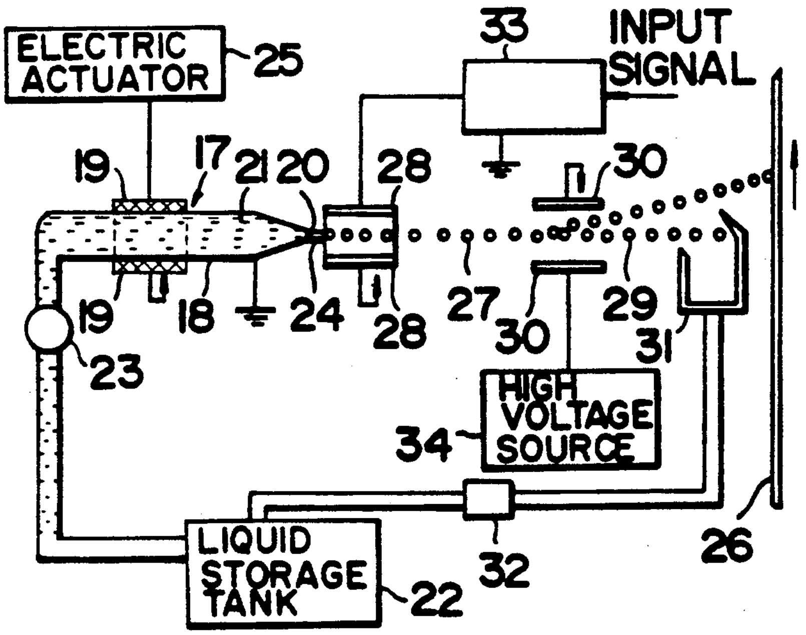

Now referring to FIG. 3, showing another preferred embodiment of the present invention, the recording head 17 is provided, in a similar manner as shown in FIG. 2, with an electrothermal transducer 19 on the nozzle 18 so as to encircle the thermal chamber portion, said nozzle 18 being provided with an orifice 20 of a determined diameter for emitting the liquid 21.

The recording head 17 is connected to a liquid reservoir 22 through a pump 23 and a pipe to apply a desired pressure to the liquid 21 contained in said nozzle 18 thereby forming a stream 24 of liquid emitted from the orifice 20 toward a surface of a record-receiving member 26.

An electric actuator 25 releasing electric pulse signals for driving the electrothermal transducer 19 is connected thereto thereby forming liquid droplets 27 at a determined time interval.

Between said recording head 17 and record-receiving member 26 and at a small distance from the front end of nozzle 18 there are provided a charging electrode 28 for charging thus formed droplets 27 and deflecting electrodes 30 for deflecting the flight direction of said droplets 27 according to the amount of charge thereof, said electrodes being arranged in such a manner that the center thereof coincides with the central axis of the nozzle 18. Also in a determined position between the deflecting electrodes 30 and record-receiving member 26 there is provided a gutter 31 for recovering the droplets 29 not utilized for recording. The droplets recovered in said gutter 31 are returned through a filter 32 to the reservoir 22 for reuse, said filter 32 being provided for removing foreign matters which may affect the recording for example by clogging the nozzle 18 from the recording medium recovered by the gutter 31.

Said charging electrode 28 is connected to a signal processing means for processing the input information signals and applying thus obtained output signals to said charging electrode 28.

Upon receipt of electrical pulse signals of a desired frequency from the electric actuator 25, the electrothermal transducer 19 accordingly applies thermal energy to the liquid contained in said thermal chamber portion to periodically cause instantaneous state change therein, and a periodic force resulting therefrom is applied to the aforementioned stream of liquid 24. As the result said stream is broken up into a succession of equally spaced droplets of a uniform diameter. At the moment of separation from said stream 24, each droplet becomes charged selectively according to the recording signals by said charging electrode 28. The droplets 27 thus charged upon passing the charging electrode 28 fly toward the record-receiving member 26, and, upon passing the space between the deflecting electrodes 30, are deflected according to the amount of charge thereon by an electric field formed between said electrodes 30 by means of a high-voltage source 34, whereby only the droplets required for recording are deposited on said member 26 to achieve desired recording.

The droplets deposited on the record-receiving member 26 can be those carrying the electrostatic charge or those not carrying the charge by suitably controlling the timing of droplet formation and the timing of application of signal voltages to the charging electrode 28.

In case the droplets used for recording are those not carrying charges, it is preferable that the droplets are projected in the direction of gravity and other associated means are arranged accordingly.

Figure 4:
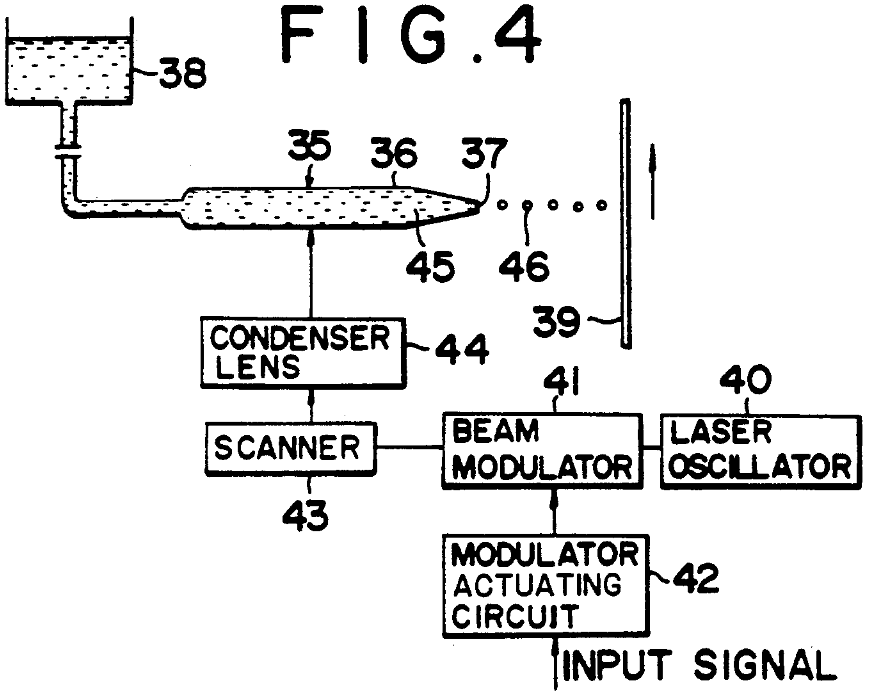

FIG. 4 schematically shows still another preferred embodiment of the present invention which is basically the same as that shown in FIG. 2 except for the use of energy of laser light as the source of thermal energy and the structural difference resulting therefrom. A laser beam generated by a laser oscillator 40 is pulse modulated in a beam modulator 41 according to the recording information signals which are in advance electrically processed in a modulator actuating circuit 42. Thus modulated laser beam passes through a scanner 43 and is focused, by a condenser lens 44, onto a determined position of a nozzle 36 constituting a part of the recording head 35, there heating the irradiated portion of nozzle 36 and/or directly heating the liquid 45 contained in said nozzle 36.

In case of focusing the laser beam on the wall of nozzle 36 and applying thus generated thermal energy to the liquid 45 contained in said nozzle 36 to cause a state change, it is advantageous to compose the irradiated portion of nozzle 36 with a material capable of effectively absorbing the laser light to generate heat, or to coat or wrap the external surface of nozzle 36 with such a material.

As an example, the irradiated portion of nozzle 36 can be coated with an infrared-absorbing and heat-generating material such as carbon black combined with a suitable resinous binder.

The embodiment shown in FIG. 4 is particularly featured in that the size of droplets 46 projected from the nozzle 36 can be arbitrarily controlled by changing the position of irradiation of the laser beam by means of the scanner 43, whereby the density of image formed on the record-receiving member 39 can be arbitrarily controlled.

Another advantage lies in a fact that the recording is not affected by the eventual charge present on the record-receiving member 39 resulting from the displacement thereof, since the droplets 46 are projected from the orifice 37 according to the information signals and are deposited onto the record-receiving member 39 without intermediate charging. This advantage is similarly obtained in the embodiment of FIG. 2.

A still further advantage lies in a fact that the recording head 35 can be of an extremely simple structure and of a low cost since the laser energy, which is in fact an electromagnetic energy, can be applied to the nozzle 36 and/or liquid 45 without any mechanical contact. This advantage is particularly manifested in case of using a multi-orificed recording head 35.

In such a multi-orificed recording head, the present embodiment is particularly advantageous also for the maintenance of the head, since the thermal energy can be applied to the liquid in each nozzle simply by irradiating each of plural nozzles with a laser beam instead of providing complicated electric circuits to each of said nozzles.

As the beam modulator 41 there can be employed various modulators ordinarily used in the field of laser recording, but for a high-speed recording particularly suitable are an acousto-optical modulator (AOM) and an electro-optical modulator (EOM). These modulators can be achieved as an external or an internal modulator in which the modulator is placed outside or inside the laser oscillator, either of which is employable in the present invention.

The scanner 43 can either be a mechanical one or an electronic one and suitably selected according to the recording speed.

Examples of such mechanical scanner are a galvanometer, an electrostriction element or a magnetostriction element coupled with a mirror and a high-speed motor coupled with a polygonal rotary mirror, a lens or a hologram, the former and the latter being respectively suitable for a low-speed and a high-speed recording.

Also the examples of such electronic scanner are an acousto-optical element, an electro-optical element and a photo-IC element.

Figure 5:
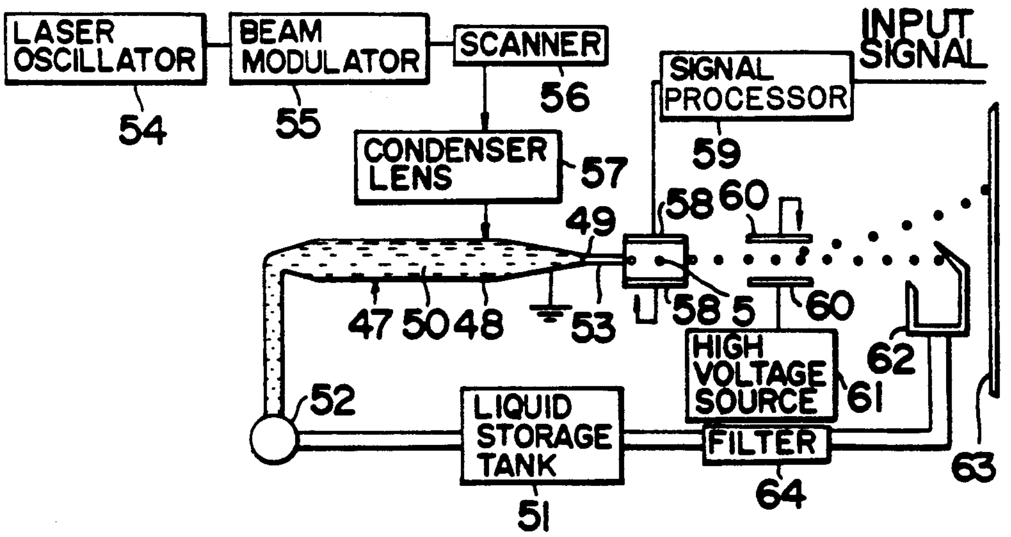

FIG. 5 schematically shows still another preferred embodiment of the present invention which is basically the same as that shown in FIG. 3 except for the use of the energy of laser light as the source of thermal energy and the accompanying differences in structure, but is provided with various advantages as enumerated in connection with the embodiment shown in FIG. 4.

In FIG. 5, a recording head 47 is composed of a nozzle 48 provided with an orifice 49 for projecting a liquid recording medium 50, which is supplied into said recording head 47 from a reservoir 51 under a determined pressure by means of a pump 52.

The recording with the apparatus shown in FIG. 5 can be achieved by modulating a laser beam generated by a laser oscillator 54 with a beam modulator 55 into light pulses of a desired frequency, and focusing said light pulses onto a determined position (thermal chamber portion) of the recording head 47 by means of a scanner 56 and a condenser lens 57.

Upon heat generation by absorption of laser energy, the liquid 50 contained in said thermal chamber portion instantaneously forms bubbles thereby periodically undergoing a state change involving volumetric change of said bubbles, and the periodic force resulting therefrom is applied to a stream of liquid emitted from the orifice 49 under the above-mentioned pressure at a determined frequency thereby breaking up said stream into a succession of equally spaced droplets of a uniform diameter.

Each droplet, at the moment of separation thereof from the stream 53 by the force resulting from the state change of liquid 50 caused by the heating effect of laser light, is charged by a charging electrode 58 according to the recording information signals.

The amount of charge on said droplet is determined by a signal obtained by processing the recording information signals in a signal processing means 59 and supplied to the charging electrode 58. After emerging from said electrode 58, the droplet is deflected according to the charge thereon, when it passes through a space between deflecting electrodes 60, by means of an electric field created therebetween by a high-voltage source 61.

In FIG. 5 the droplets deflected by said deflecting electrodes 60 are deposited on a record-receiving member 63 while those not deflected encounter and are recovered by a gutter 62 for reuse.

The recording medium captured in the gutter 62 is returned to the reservoir 51 after removal of foreign matters by a filter 64.

In the embodiment shown in FIG. 5, it is also possible, if desired, to guide the laser beam generated by the laser oscillator 54 directly to the determined position of the recording head 47, omitting the beam modulator 55, scanner 56 and condenser lens 57. Also the laser oscillator 54 may either be a continuous oscillation type or a pulse oscillation type.

FIG. 6 schematically shows still another preferred embodiment of the present invention, in which a recording head 65 is provided with an orifice 66 for projecting a liquid recording medium, an orifice 67 for introducing said medium, and an electrothermal transducer 69 on the external surface of wall 70 of a thermal chamber portion 68 where the liquid recording medium undergoes a state change under the effect of thermal energy.

Said electrothermal transducer 69 is generally composed of a heat-generating resistor 71 provided on the external wall of said wall 70, electrodes 72, 73 provided on respective ends of said resistor 71 for supplying a current thereto, an anti-oxidation layer 74 as a protective layer provided on said resistor 71 to prevent oxidation thereof, and eventually an anti-abrasion layer 75 for preventing damage resulting from mechanical abrasion, if necessary.

Examples of materials adapted for forming said heat-generating resistor 71 are tantalum nitride, nichrome, silver-palladium alloy, silicon semiconductor, and borides of metals such as hafnium, lanthanum, zirconium, titanium, tantalum, tungsten, molybdenum, niobium, chromium or vanadium.

Among the above-mentioned materials particularly preferred are metal borides in which the preference is given in the decreasing order of hafnium boride, zirconium boride, lanthanum boride, tantalum boride, vanadium boride and niobium boride.

Said resistor 71 can be prepared from the abovementioned materials by means for example of electron beam evaporation or sputtering.

The thickness of said resistor 71 is determined in relation to the surface area thereof, material, shape and dimension of thermal chamber portion $\Delta l$, actual power consumption etc. so as to obtain a desired heat generation per unit time, and is generally in a range of 0.001 to 5 $\mu$, preferably 0.01 to 1 $\mu$.

The electrodes 72 and 73 can be composed of various materials ordinarily used for forming such electrodes, for example metals such as Al, Ag, Au, Pt, Cu, etc., and can be prepared for example by evaporation with desired size, shape and thickness in a desired position.

Said anti-oxidation layer 74 is for example composed of $SiO_2$ and can be prepared for example by sputtering.

The anti-abrasion layer 75 is for example composed of $Ta_2O_5$ and can also be prepared for example by sputtering.

The nozzle 76 can be composed of almost any material capable of effectively transmitting the thermal energy from the electrothermal transducer 69 to the liquid recording medium 80 contained in said nozzle 76 without undergoing irreversible deformation by said thermal energy. Representative examples of such preferred material are ceramics, glass, metals, heat-resistant plastics etc. Particularly glass is preferable because of easy working and adequate thermal resistance, thermal expansion coefficient and thermal conductivity. For effective projection of the liquid recording medium from the orifice 66, the material constituting the nozzle 76 should preferably be provided with a relatively small thermal expansion coefficient.

As an example the electrothermal transducer 69 can be obtained by subjecting a pretreated glass nozzle to sputtering of $ZrBr_2$ in a thickness of 800 Å to form a heat-generating resistor, then to formation of aluminum electrodes of a thickness of 500 μm by masked evaporation, and to sputtering of an $SiO_2$ protective layer in a thickness of 2 μm and with a width of 2 mm so as to cover said resistor.

In this example the nozzle 76 is composed of a glass fiber cylinder with an internal diameter of 100 μ and a thickness of 10 μ, but said nozzle need not necessarily be cylindrical as will be explained later.

An orifice 66 of a diameter of 60 μ integral with said nozzle 76 is formed by heat melting thereof, but the orifice may also be prepared as a separate piece for example by boring a glass plate with an electron beam or a laser beam and then combining the plate with the nozzle 76. Such method is particularly useful in case of preparing a head provided with plural thermal chamber portions and with plural orifices.

The circumference of said orifice 66 and particularly the external surface therearound should preferably be provided with a water-repellent or oil-repellent treatment, respectively when the liquid recording medium is aqueous or non-aqueous, in order to prevent the liquid medium leaking from the orifice and wetting the external surface of nozzle 76.

The material for such treatment should be suitably selected according to the material of the nozzle and the nature of the liquid recording medium, and various commercially available materials can be effectively used for this purpose. Examples of such material are FC-721 and FC-706 manufactured by 3M Company.

In the illustrated embodiment the rear orifice 67 extends 10 mm backward from the center of the heat-generating resistor and is connected to a pipe 79 for supplying the liquid 80 from the reservoir 78, but may also be of a constricted shape with a cross section smaller than that of the thermal chamber portion in order to reduce backward pressure transmission.

Upon application between the electrodes 72 and 73 of a pulse voltage generated by an actuating circuit 77 for electrically driving said electrothermal transducer 69, the resistor 71 generates heat which is transmitted through the wall 70 to the liquid recording medium 80 supplied to the nozzle 76 from the reservoir 78 through the pipe 79. Upon receipt of said thermal energy the liquid recording medium present in the thermal chamber portion 68 at least reaches the internal gasification temperature to generate bubbles in said thermal chamber portion. The instantaneous volumetric increase of said bubbles applies, from the side of said portion, a pressure which is in excess of the surface tension of said medium at the orifice, whereby said medium is projected from the orifice 66 in a form of droplets. The resistor 71 terminates heat generation simultaneously with the trailing down of the pulse voltage whereby the bubbles reduce in volume and vanish and the thermal chamber portion 68 becomes filled with the replenishing liquid medium. In this manner it is possible to repeat the formation and vanishing of bubbles in the portion 68 with repeated emissions of droplets from the orifice 66 by applying, in succession, pulse voltages generated by the actuating circuit 77 to the electrodes 72, 73.

In case of fixing the electrothermal transducer 69 on the nozzle 76 as in the recording head 65 shown in FIG. 6, there may be provided plural transducers on the external surface of nozzle 76 in order to allow a change in the functioning position of thermal energy. Also the use of a structure having a resistor 71 divided into plural portions and provided with corresponding plural lead electrodes will permit obtainment of a suitable heating capacity distribution by supplying electric current to at least two electrodes selected appropriately, thereby allowing not only modification of the dimension and position of the functioning area of thermal energy but also regulation of the heat generating capacity.

Though in FIG. 6 the electrothermal transducer 69 is provided only on one side of the nozzle 76, it may also be provided on both sides or along the entire circumference of the nozzle 76.

Figure 16:
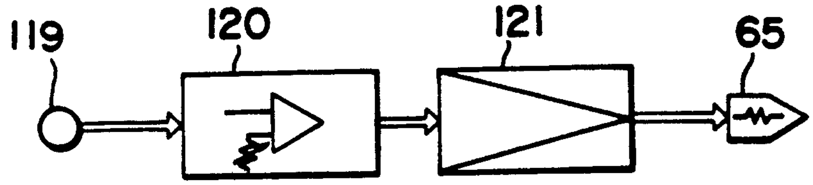
FIG. 16 is a block diagram showing an example of control mechanism for use in recording with a recording head shown in FIG. 6.

When the recording head 65 of FIG. 6 prepared in the above-explained manner is used in the apparatus shown in the block diagram of FIG. 16, a clear image could be obtained by applying pulse signals to the electrothermal transducer according to the image signals while supplying the liquid recording medium under a pressure of a magnitude not causing emission thereof from the orifice 66 when the resistor 71 does not generate heat.

Now referring to FIG. 16 showing the block diagram of the above-mentioned apparatus, an input sensor 119 composed for example of a photodiode receives image information signals which, after processing in a processing circuit 120, are supplied to a drive circuit 121 which drives the recording head 65 by modifying the width, amplitude and frequency of pulses according to the input signals.

For example, in a most simple recording, the processing circuit 120 identifies the black and white of the input image signals and supplies the results to the drive circuit 121, which generates signals of a controlled frequency for obtaining a desired droplet density and of a pulse width and a pulse amplitude for obtaining an adequate droplet size thereby controlling the recording head 65.

Also in case of a recording involving gradation, it is also possible to modulate the droplet size or the number of droplets as explained in the following.

In case of recording with variable droplet size, the drive circuit 121 is provided with plural circuits each releasing drive pulse signals of determined width and amplitude corresponding to a determined droplet size, and the processing circuit 120 processes the image signals received by the input sensor 119 and identifies a circuit to be used among said plural circuits. Also in the recording with variable number of droplets, the processing circuit 120 converts the input signals received by the input sensor 119 to digital signals, according to which the drive circuit 121 drives the recording head 65 in such a manner that the number of droplets per unit input signal is variable.

Also in a recording with a similar apparatus it was confirmed that droplets of a number corresponding to the applied frequency could be stably projected with a uniform diameter by applying repeating pulse voltages to the electrothermal transducer 69 while supplying the liquid recording medium 80 to the recording head 65 under a pressure of a magnitude causing overflow of said medium from the orifice 66 when the resistor 71 is not generating heat.

From the foregoing results the recording head 65 shown in FIG. 6 is extremely effective for continuous droplet projection at a high frequency.

Furthermore, the recording head shown in FIG. 6 and constituting a principal portion of the present invention, being very small in size, can be easily formed into a unit of multiple nozzles, thereby obtaining a high-density multi-orificed recording head. In such case the supply of liquid recording medium can be achieved not by plural means individually corresponding to said nozzles but by a common means serving all these nozzles.

Now FIG. 7 schematically shows a basic embodiment of a recording head adapted for use when the energy of a laser is employed as the source of thermal energy.

The recording head 81 is provided, on the external surface of nozzle 82, with a photothermal transducer 83 for generating thermal energy upon absorption of laser energy and supplying said thermal energy to a liquid contained in the nozzle 82. Said photothermal transducer or converter 83 is provided in case said liquid is incapable of causing a state change sufficient for projecting the liquid from an orifice 84 upon heat generation by absorption of laser energy by said liquid itself or in case said liquid undergoes no or almost no laser energy absorption and heat generation as explained above, and may therefore be dispensed with if said liquid itself is capable of generating heat, upon absorption of laser energy, to undergo a state change enough for causing projection of the liquid from the orifice 84.

For example in case of using an infrared laser as the source of laser energy, the photothermal transducer 83 can be composed of an infrared-absorbing heat-generating material which, if provided with enough film-forming and adhering properties, can be directly coated on a determined portion on the external wall of nozzle 82, or, if not provided with such properties, can be coated after being dispersed in a suitable heat-resistant binder having such film-forming and adhering properties. As such infrared absorbing material there can be employed the infrared absorbing materials mentioned in the foregoing as the additive to the liquid. Also the preferred examples of said binder are heat-resistant fluorinated resins such as polytetrafluoroethylene, polyfluoroethylene-propylene, tetrafluoroethyleneperfluoroalcoxy-substituted perfluorovinyl copolymer etc., and other synthetic heat-resistant resins.

The thickness of said photothermal transducer 83 is suitably determined in relation to the strength of laser energy to be employed, the heat-generating efficiency of the photothermal transducer to be formed, the species of liquid to be employed etc., and is generally selected within a range of 1 to 1000 μ, preferably 10 to 500 μ.

When said photothermal transducer is to be provided, the nozzle is to be made of a material having suitable thermal conductivity and thermal expansion coefficient, and is preferably designed so as to allow substantially all the thermal energy generated to be transmitted to the recording medium present directly under the portion irradiated with the laser energy, for example by a thin wall structure.

FIG. 8 shows, in cross-sectional views, still other recording heads adapted for use in the present invention. A recording head 85 shown in FIG. 8(*a*) is provided, inside a nozzle 86, with plural hollow tubes 87, for example fiber glass tubes, each tube being supplied with the liquid. This recording head 85, being capable of controlling the size of droplets to be emitted from the orifice of nozzle 86 in response to the amount of thermal energy applied, is featured in providing a recorded image with an excellent gradation by controlling the amount of thermal energy to be applied according to the recording information signals.

The liquid recording medium emitted from the orifice of nozzle 86 is supplied from a part of the hollow tubes in the nozzle when the amount of applied thermal energy is small, while the liquid medium contained in all the hollow tubes 87 is emitted from the nozzle 86 when the amount of applied thermal energy is sufficiently large.

Although in FIG. 8(*a*) the nozzle 86 is provided with a circular cross section, it is by no means limited to such shape but may also assume other cross-sectional shapes such as square, rectangular or semi-circular shape. Particularly when a thermal transducer is provided on the external surface of the nozzle 86, the external surface should preferably be provided with a planar portion at least in the position of said transducer in order to facilitate mounting thereof.

The recording head 88 shown in FIG. 8(*b*) is, unlike that shown in FIG. 8(*a*), provided with plural filled circular rods 90 inside the nozzle 89. This structure allows an increase in the mechanical strength of the nozzle 89 when it is made of a relatively breakable material such as glass.

In said recording head 88 the liquid recording medium is supplied into the spaces 91 inside the nozzle 89 and emitted therefrom upon receipt of thermal energy.

The recording head 92 shown in FIG. 8(*c*) is composed of a member 93 in which a recessed groove is formed for example by etching, and a thermal transducer 94 covering the open portion of said groove. This structure allows reduction of the loss of thermal energy as it is directly applied from the transducer to the recording medium.

It is to be noted that the cross-sectional structure shown in FIG. 8(*c*) need not be as illustrated in the entirety thereof as long as the portion of the recording head 88 for mounting the transducer 94 is structured as illustrated. Stated differently, in the vicinity of orifice of recording head 88 for emitting the liquid recording medium, the member 93 may be provided with a rectangular or circular hollow structure instead of a grooved shape.

The structure of the recording head in the present invention, particularly that employing laser energy as the source of thermal energy, being substantially simpler than that of conventional recording heads, allows various designs of recording head and nozzle thereof, with the resulting improvement in the quality of recorded image.

Particularly in the present invention it is extremely easy to obtain a multi-nozzled recording head with a simple structure, which is greatly advantageous in mechanical working and mass production.

Figure 9A:
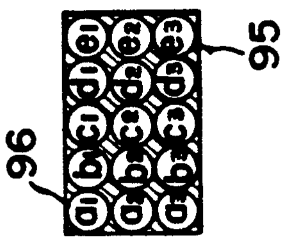
FIGS. 9(*a*), (*b*) and (*c*) are schematic views of a preferred embodiment of a multi-orificed recording head wherein (a), (b) and (c) are a front view, a lateral view and a cross-sectional view along the line X-Y in (b), respectively.
Figure 9B:
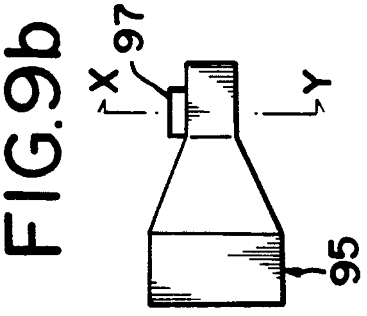
Figure 9C:
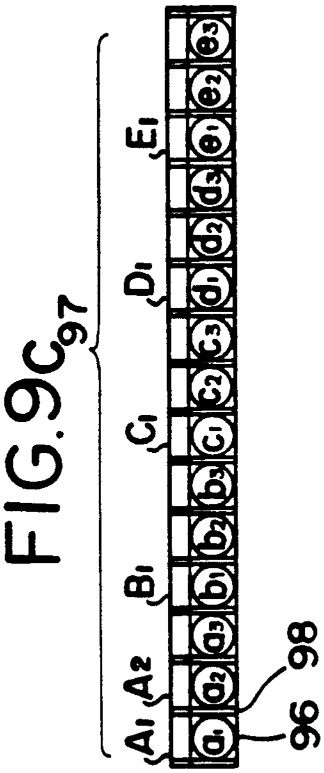

FIG. 9 shows a preferred embodiment of a multi-orificed recording head, wherein (a), (b) and (c) are respectively a schematic front view of the orifice side for projecting the liquid recording medium of a recording head 95, a schematic lateral view thereof and a schematic cross-sectional view thereof along the line X-Y.

Said recording head 95 is provided with 15 nozzles which are arranged in a line in the portion X-Y as shown in FIG. 9(*c*) but of which orifices are arranged in three rows by five columns (a1, a2, a3, b1, . . . . , e1, e2, e3) as shown in FIG. 9(*a*). The recording head of such structure is particularly suitable for highspeed recording, as the recording can be achieved with a relatively small displacement of the head, or even without any displacement thereof if the number of nozzles is further increased.

Furthermore said recording head is featured in that the mounting of 15 electrothermal transducers 97 to the nozzles is facilitated as said nozzles are arranged in a line in the portion X-Y.

Although the mounting of electrothermal transducers to the nozzles is difficult if the nozzles receiving said transducers are arranged as shown in FIG. 9(*a*) and the complicated structure will pose a problem in the production technology even if the mounting itself is possible, the aligned arrangement of the portion X-Y of nozzles as shown in FIG. 9(*c*) allows the mounting of electrothermal transducers (A1, A2, . . . , B1, . . . , C1, . . . , D1, . . . , E1, . . . ) to said nozzles with a*p1785Xtechnical facility similar to that in case of preparing a single-head recording head.

Also the electric wirings to the electrothermal transducers 97 can be achieved in substantially the same manner as in a single-nozzle recording head.

In the structure of recording head 95 shown in FIG. 9, the nozzles are arranged, in the X-Y portion receiving said electrothermal transducers 97, in the order of a1, a2, a3, b1, b2, b3, c1, c2, c3, d1, d2, d3, e1, e2 and e3 corresponding to the arrangement of orifices shown in FIG. 9(*a*), but it is also possible to employ an arrangement in the order of a1, b1, c1, a2, b2, c2, a3, b3, c3, a4, b4, c4, a5, b5 and c5. Thus the order of arrangement of nozzles can be suitably selected according to the scanning method used in the recording.

In case the distance between the nozzles in the portion X-Y is very small and there exists a possibility of cross-talk between the adjacent nozzles, namely an effect of thermal energy developed by an electrothermal transducer to the neighboring nozzle, it is also possible to provide a heat insulator in each space between the neighboring nozzles and transducers. In this manner each nozzle receives only the thermal energy generated by an electrothermal transducer attached thereto, and it is rendered possible to obtain an improved recorded image without so-called fogging.

Although a checkerboard arrangement is employed for the orifices of recording head 95 shown in FIG. 9, it is also possible to adopt other arrangements therefor, for example a dislodged grating arrangement or an arrangement in which the number of nozzles in each row varies.

Figure 10A:
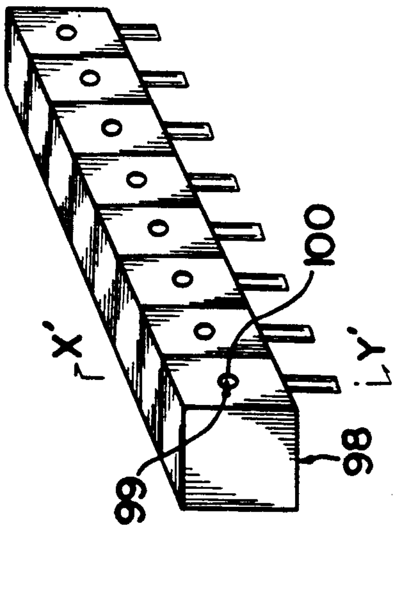
FIGS. 10(*a*) and (*b*) are schematic views of another preferred embodiment of a multi-orificed recording head wherein (a) and (b) are a schematic perspective view and a cross-sectional view along the line X'-Y' in (a), respectively.
Figure 10B:
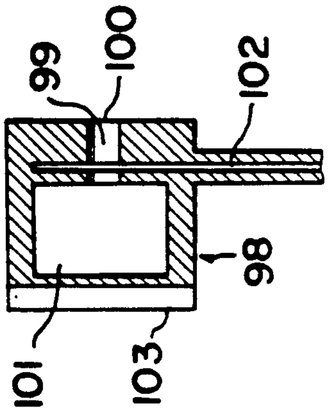

FIG. 10 shows still another embodiment of a recording head adapted for use in the present invention, wherein (a) and (b) are respectively a schematic perspective view of a recording head 98 and a schematic cross-sectional view thereof along the dotted line X'-Y'.

The recording head 98 is of a multi-orificed structure composed of a linear combination of plural single-orifice recording heads each comprising a nozzle 99 having an orifice 100, a thermal chamber 101 connected to said nozzle 99, a supply channel 102 for introducing the liquid recording medium into said nozzle 99, and an electrothermal transducer 103. The electrothermal transducer of each single-orifice recording head constituting the recording head 98 is respectively supplied with energy to cause emission of droplets of said recording medium from each orifice.

Said recording head 98 is featured in the presence of the thermal chamber 101 the volume of which is relatively larger than that of nozzle 99 and which is provided in the rear face with the electrothermal transducer 103, whereby the response is improved as the volume of recording medium undergoing a state change under the influence of thermal energy becomes larger.

In case of using laser energy as the source of thermal energy, the above-mentioned electrothermal transducer is naturally replaced by a photothermal transducer. However it is also possible to cause a state change, even without said photothermal transducer, for example by irradiating said thermal chamber in the rear face thereof with a laser beam to apply thermal energy directly to the liquid recording medium contained in said thermal chamber 101.

Figure 11:
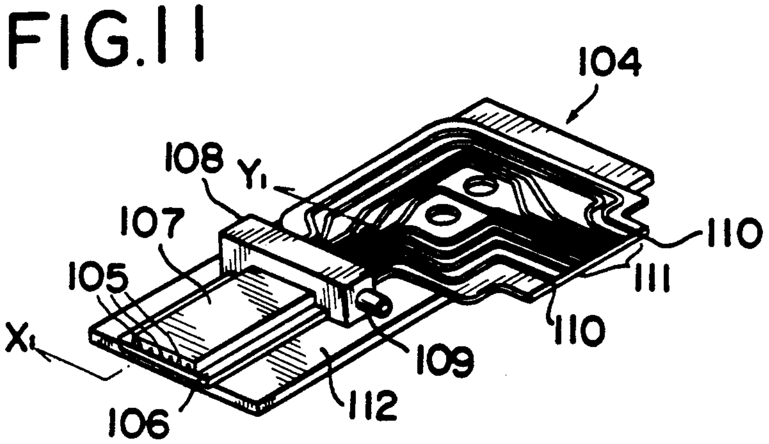
Figure 12:
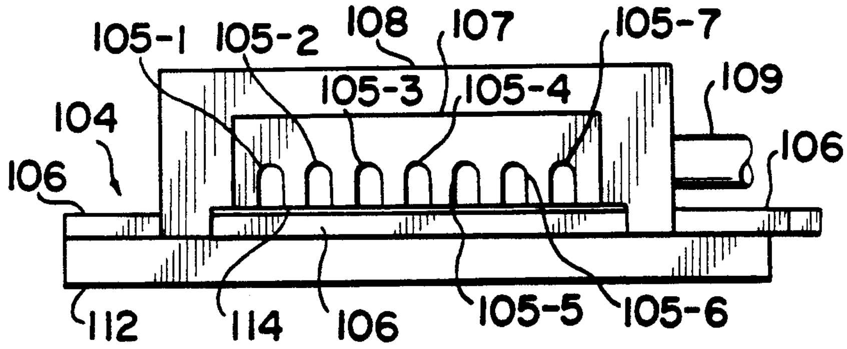
Figure 13:
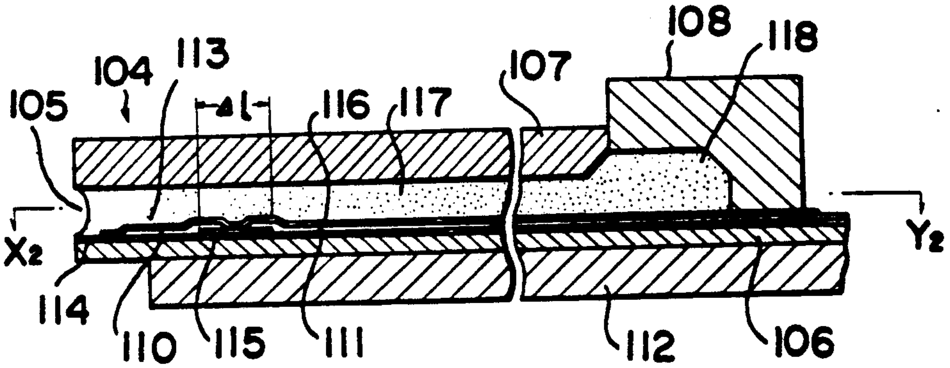
Figure 14:
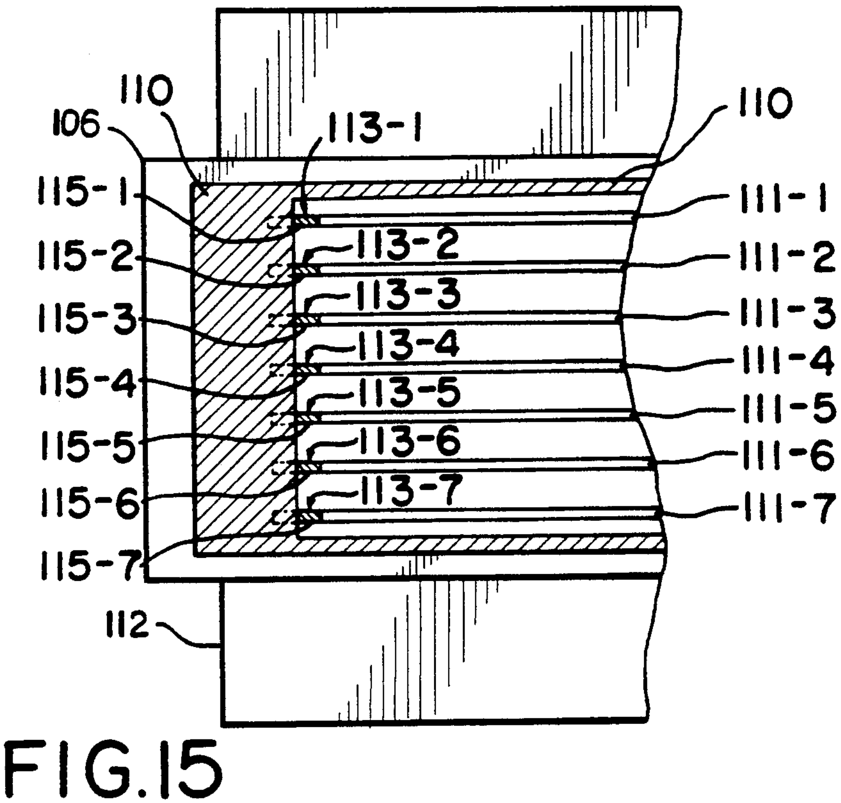

Now referring to FIGS. 11–14, there will be explained still another preferred embodiment of the recording head constituting a principal portion of the present invention, wherein FIG. 11 is a schematic perspective view of a multi-orificed recording head 104, FIG. 12 is a schematic elevation view of said recording head, FIG. 13 is a partially cut-off cross-sectional view along the line X1-Y1 in FIG. 11 showing internal structure of said head, and FIG. 14 is a partially cut-off cross-sectional view along the line X2-Y2 in FIG. 13 for explaining a planar structure of the electrothermal transducers employed in the recording head shown in FIG. 11.

In FIG. 11 the recording head 104 is provided with seven orifices 105 for the purpose of clarity, but the number of orifices is not limited thereto and can be arbitrarily selected from one to any desired number. Also the multi-orificed recording head may be provided with a multi-array arrangement of orifices instead of single-array arrangement shown in FIG. 11.

The recording head 104 shown in FIG. 11 is composed of a base plate 106 and a cover plate 107 which is provided with seven grooves the grooved surface being affixed onto a front end portion of said base plate 106 to form seven nozzles and corresponding seven orifices 105 located at the front end.

108 is a supply chamber cover which forms, in cooperation with said cover plate 107, a common supply chamber 118 for supplying the liquid recording medium to said seven nozzles, said supply chamber 118 being provided with a pipe 109 for receiving supply of the liquid from an external liquid reservoir (not shown).

On the surface of rear end of base plate 106 there are provided, for connection with external electric means, lead contacts connected to a common electrode 110 and selection electrodes 111 of electrothermal transducers respectively mounted on said seven nozzles.

On the rear surface of base plate 106 there is provided a heat sink 112 for improving the response of electrothermal transducers, said heat sink being however dispensable in case the base plate 106 itself performs the above-mentioned function.

FIG. 12 shows the recording head 104 of FIG. 11 in an elevation view for particularly clarifying the arrangement of emitting orifices 105.

In the recording head 104, the orifices 105, though being illustrated in an approximately semi-circular shape, may also be of other shapes such as rectangular, or circular shape etc., suitably selected according to the convenience of mechanical working.

The recording head 104 of the present invention allows easy obtainment of a high-density multi-orificed structure as the structural simplicity thereof permits the use of ultra-microworking technology for minimizing the dimension of orifices 105 and spacings therebetween. Consequently it is easily possible to achieve a high resolution in the recording head and accordingly in the recorded image. As an example a resolution of 10 line pairs/mm is achieved by certain heads thus far prepared in this manner.

FIG. 13 is a partial cross-sectional view along the line X1-Y1 in FIG. 11 showing the internal structure of the recording head 104, particularly the structure of electrothermal transducer 113 and the liquid flow path therein.

The electrothermal transducer 113 is essentially composed of a heat-generating resistor 115 provided on a heat-accumulating layer 114 eventually provided for example by evaporation or plating on a base plate 106, and a common electrode 110 and a selecting electrode 111 both for supplying current to said resistor 115, said transducer being eventually provided thereon, if necessary, with a protective insulating layer 116 for preventing electric leak between the electrodes by the liquid and/or preventing staining of electrodes 110, 111 and resistor 115 by the liquid 117 and/or preventing oxidation of said resistor 115.

A supply chamber is formed as a space enclosed by a cover plate 107, chamber lid 108 and the base plate 106 and is in communication with each of seven nozzles formed by the base plate 106 and cover plate member 107, and further in communication with a pipe 109 through which the liquid supplied from outside is introduced into each of said nozzles. Also said supply chamber 118 should be designed with such a volume and a shape as to have a sufficient impedance, when a backward wave developed in the thermal chamber portion Δl in each nozzle cannot be dissipated within each nozzle and is transmitted to said supply chamber, to such backward wave to prevent mutual interference in the emissions from different nozzles.

Although said supply chamber 118 is composed of a space enclosed by the cover plate 107, chamber lid 108 and base plate 106 in the illustrated recording head 104, it may also be composed of a space surrounded by the chamber lid 108 and base plate 106 or of a space enclosed solely by said chamber lid 108.

In consideration, however, of the ease of working and assembly as well as the desired working precision, most preferred is the recording head 104 of the structure shown in FIG. 11.

FIG. 14 is a partial cross-sectional view along the line X2-Y2 in FIG. 13 showing the planar structure of electrothermal transducers 113 used in the recording head 104.

Seven electrothermal transducers (113-1, 113-2, . . . , 113-7) of a determined size and shape are provided on the base plate 106 respectively corresponding to seven nozzles, and a common electrode 110 is provided in electrical contact, in a part thereof, with an end at the orifice side of each of said seven resistors (115-1, 115-2, . . . , 115-7) and with a contact lead portion surrounding seven parallel nozzles to allow electrical connection to an external circuit.

Also said seven resistors 115 are respectively provided with selecting electrodes (111-1, 111-2, . . . , 111-7) along the flow paths of liquid.

The electrothermal transducers 113 which are provided on the base plate 106 in the illustrated recording head 104 may instead be provided on the cover member 107. Further, the grooves for forming the nozzles, which are provided in the cover member 107 in case of the illustrated structure, may instead be provided on the base plate 106, or provided on both of the cover 107 and the base plate 106. When said grooves are provided on the base plate 106, the electrothermal transducers are preferably provided on the cover member 107 for ease of preparation.

Referring to FIG. 13, upon application of a pulse voltage between the electrodes 110 and 111, the resistor 115 begins to generate heat, which is transmitted, through the protective layer 116 to the liquid contained in the thermal chamber portion Δl. Upon receipt of said thermal energy the liquid at least reaches a temperature of internal gasification to generate bubbles in the thermal chamber portion Δl. The volume increase resulting from said bubble formation applies a pressure to the liquid located closer to the orifice larger than the surface tension thereof at the orifice 105 to cause projection of droplets from the orifice 105. Simultaneously with the trailing down of the pulse voltage the resistor 115 terminates heat generation, so that the generated bubbles contract in size and vanish, and the emitted liquid is replenished by the newly supplied liquid. The formation and vanishing of bubbles are repeated in the chamber portion Δl in response to successive application of pulse voltages between the electrodes 110 and 111 in the above-mentioned manner, thereby achieving projection of droplets from the orifice 105 corresponding to each pulse voltage application.

The protective layer 116 need not necessarily be insulating if the liquid 117 has an electric resistance significantly higher than that of the resistor 115 and thus does not cause electric leak between the electrodes 110 and 111 even in the eventual presence of said liquid therebetween, and is only required to satisfy other requirements among which most important is a property to maximize effective transmission of heat generated by the resistor 115 to the thermal chamber portion Δl.

The material and thickness of said protective layer are so selected as to obtain properties responding to the foregoing requirement in addition to the above-explained property.

The useful examples of material for forming the protective layer 116 are silicon oxide, magnesium oxide, aluminum oxide, tantalum oxide, zirconium oxide etc. which can be deposited into a form of layer by means for example of electron beam evaporation or sputtering. Also said layer may be of a multiple layer structure having two or more layers. The thickness of layer is determined by various factors such as the material to be used, material, shape and dimension of the resistor 115, material of the base plate 106, thermal response from the resistor 115 to the liquid contained in the thermal chamber portion Δl, prevention of oxidation required for the resistor 115, prevention of liquid permeation required for the resistor 115, electric insulation etc., and is usually selected within a range from 0.01 to 10 $\mu$, preferably from 0.1 to 5 $\mu$, and most preferably from 0.1 to 3 $\mu$.

For the purpose of more effectively applying the thermal energy developed by the resistor to the liquid contained in the thermal chamber portion Δl thereby improving the response, also enabling stable continuous projection of liquid for a prolonged period and achieving a sufficient compliance of the liquid projection even when the resistor 115 is driven with a high driving frequency, the heat-accumulating layer 114 and the base plate 106 are preferably structured in the following manner to further improve the performance of heat-generating resistor 115.

Figure 15:
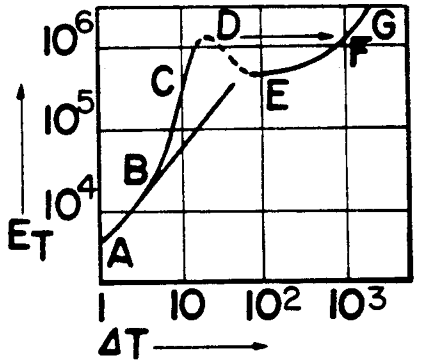
FIG. 15 is a chart showing the relationship between the energy transmission and the temperature difference $\Delta T$ between the surface temperature of a heating element and the boiling temperature of the liquid.

FIG. 15 shows a general relationship between the difference ΔT between the surface temperature TR of resistor and the boiling point Tb of liquid represented in the abscissa and the thermal energy ET transmitted from the resistor to the liquid represented in the ordinate. As clearly shown in this chart, the energy transmission to the liquid is conducted efficiently in a temperature region around point D (the maximum temperature at which the liquid is subjected only to nucleate boiling) where the surface temperature TR of resistor is several tens of degrees higher than the boiling point Tb of liquid, while it becomes less efficient in a region around point E where said surface temperature is approximately 100° C. higher than the boiling temperature Tb of liquid since rapid bubble formation between the resistor and the liquid hinders the heat transmission therebetween.

Thus, in order to improve the projecting efficiency, response and frequency characteristics it is desirable to minimize the heating period in a region represented by the curve A-B-C-D-E for achieving instantaneous and efficient energy transmission to the liquid present close to the surface of resistor and for avoiding transmission to the liquid present in other areas, and to resume the original temperature instantaneously as soon as the heat generation is terminated.

Based on the foregoing considerations the heat-accumulating layer 114 should perform a function of preventing heat diffusion to the base plate 106 when the heat generated by the resistor 115 is required thereby achieving effective heat transmission to the liquid contained in the thermal chamber portion Δl, and of causing heat diffusion to the base plate 106 when said heat is not required, and the material and thickness of said layer are to be determined in consideration of the above-mentioned requirement. Examples of material useful for forming said heat-accumulating layer 114 are silicon oxide, zirconium oxide, tantalum oxide, magnesium oxide, aluminum oxide etc., which can be deposited in a form of layer by means for example of electron beam evaporation or sputtering.

The layer thickness is suitably determined according to the material to be used, materials to be used for the base plate 106 and resistor 115 etc. so as to achieve the above-mentioned function, and is usually selected within a range from 0.01 to 50 μ, preferably from 0.1 to 30 μ and most preferably from 0.5 to 10 μ.

The base plate 106 is composed of a heat-conductive material, such as a metal, for dissipating unnecessary heat generated by the resistor 115. Examples of metal usable for this purpose are Al, Cu and stainless steel among which the most preferred is aluminum.

The cover member 107 and the supply chamber lid 108 may be composed of almost any material as long as it is not or substantially not thermally deformed at the preparation or during the use of recording head and it accepts easily precision working to achieve a desired accuracy of surfaces and to realize smooth flow of liquid in the paths obtained by such working.

Representative examples of such material are ceramics, glass, metals, plastics etc., among which particularly preferred are glass and plastics for the ease of working, and the appropriate thermal resistance, thermal expansion coefficient and thermal conductivity they have.

As already explained in connection with FIG. 6, the external surface around the orifices is preferably subjected to a water-repellent or oil-repellent treatment, respectively when the liquid is aqueous or non-aqueous, in order to prevent that said surface becomes wetted by the liquid leaking from the orifice.

In the following given is a preferred example of preparation of recording head 104 shown in FIG. 11. An $Al_2O_3$ base plate 106 of a thickness of 0.6 mm was subjected to sputtering of $SiO_2$ to obtain a heat-accumulating layer of a thickness of 3 μ, then to sputtering of $ZrB_2$ of a thickness of 800 Å as the heat-generating resistor and of Al of a thickness of 5000 Å as the electrodes, followed by selective photoetching to form seven resistors each of 400 Ω in resistance and 50 μ wide and 300 μ in dimension arranged at a pitch of 250 μ, and further subjected to sputtering of $SiO_2$ into a thickness of 1 μ as the insulating protective layer 116 thereby completing the electrothermal transducers.

Successively a glass cover plate on which grooves of 60 μ wide and 60 μ deep were formed at a pitch of 250 μ by a microcutter and a glass chamber plate 108 were adhered on said base plate 106 on which the electrothermal transducers were prepared in the above-explained manner, and an aluminum heat sink 112 was adhered on a surface opposite to the above-mentioned adhered surface.

In the present example, as the orifice 105 obtained was satisfactorily small, there was conducted no other particular step such as to attach a separate member on the front end of nozzle for forming an orifice of desired diameter. However it is also possible to mount an orifice plate having an orifice of a desired shape to the front end of the nozzle in case the nozzle has a larger diameter or it is desirable to improve the emission characteristics or to modify the size of droplets to be emitted.

Now there will be given an explanation on the control mechanism for use in recording with a recording apparatus incorporating a recording head 104 shown in FIG. 11, while making reference to FIGS. 17 to 24. FIGS. 17 to 20 show an embodiment of the control mechanism adapted for use in case of simultaneously controlling the electrothermal transducers (113-1, 113-2, . . . , 113-7) according to external signals thereby causing simultaneous droplet emission from the orifices (105-1, 105-2, . . . , 105-7) corresponding to said signals.

Figure 17:
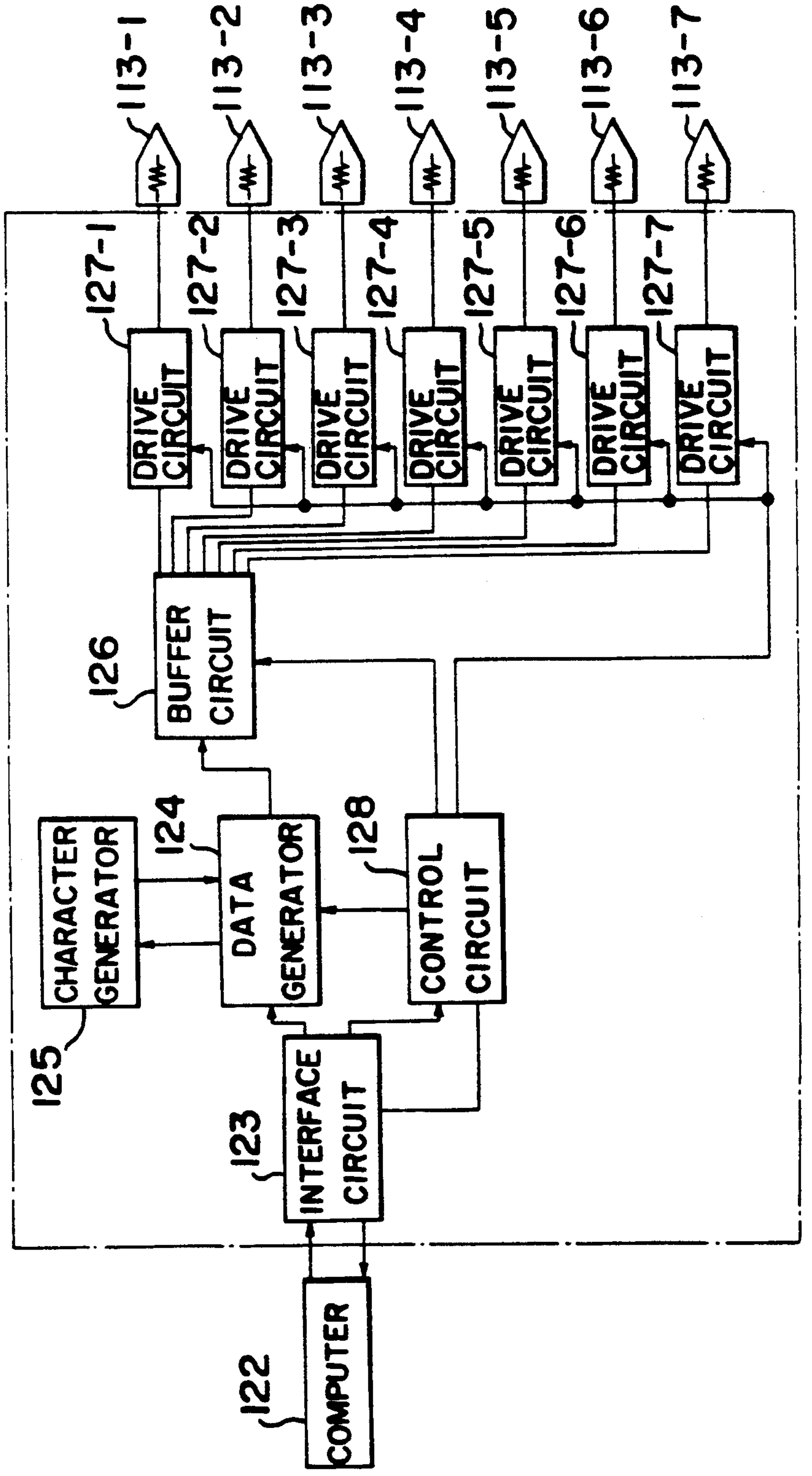
FIG. 17 is a block diagram showing an example of control mechanism for use in recording with a recording head shown in FIG. 11.

Referring to FIG. 17 showing a block diagram of the entire apparatus, input signals obtained by keyboard operation of a computer 122 are supplied from an interface circuit 123 to a data generator 124, which selects desired characters from a character generator 125 and arranges the data signals into a form suitable for printing. Thus arranged data are temporarily stored in a buffer circuit 126 and supplied in succession to drive circuits 127 to drive corresponding transducers (113-1, 113-2, . . . , 113-7) for causing droplet emission. Also there is provided a control circuit 128 for controlling the timings of input and output of other circuits and also for releasing instruction signals therefor.

Figure 18:
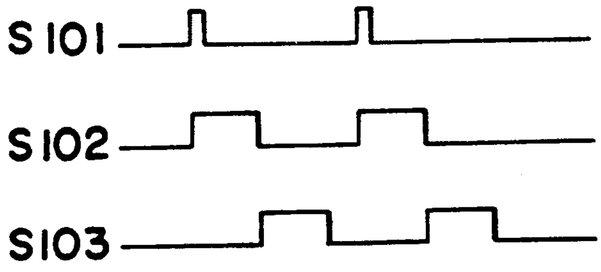
FIG. 18 is a timing chart showing the buffer function of a buffer circuit shown in FIG. 17.

FIG. 18 is a timing chart showing the function of the buffer circuit 126 shown in FIG. 17, which receives data signals S102 arranged in the data generator 124 in synchronization with character clock signals S101 generated in the character generator and releases output signals to the drive circuits 127 in different timings. Although said input and output functions are performed by one buffer circuit in case of the embodiment shown in FIG. 17, it is also possible to perform these functions with plural buffer circuits, namely by so-called double buffer control in which a buffer circuit performs an input function while the other buffer circuit performs an output function and in the next timing the functions of said buffer circuits are interchanged. In such double buffer control it is also possible to cause continuous projection of droplets.

Figure 19:
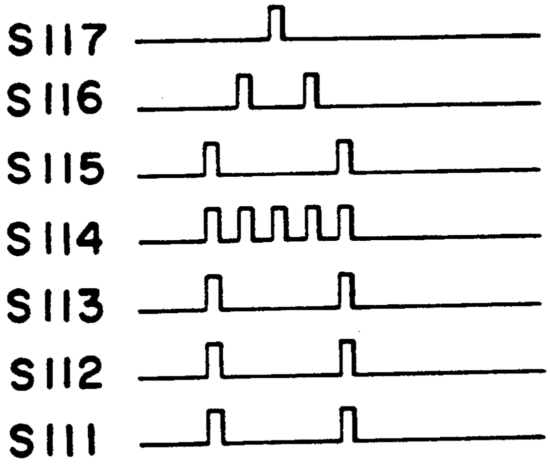
FIG. 19 is a timing chart showing an example of the timing of signals to be applied to the electro-thermal transducers shown in FIG. 17.
Figure 20:
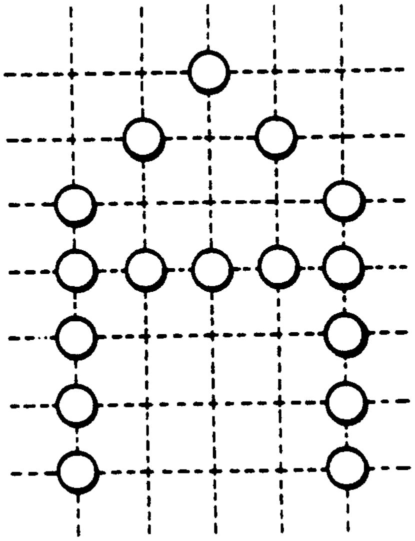
FIG. 20 is a view of an example of printing obtainable in the above-mentioned case.

In this manner seven transducers (113-1, 113-2, . . . , 113-7) are simultaneously controlled for example according to a timing chart of droplet emission as shown in FIG. 19, thereby creating a print as shown in FIG. 20 by means of droplets projected from seven orifices. The signals S111–S117 respectively represent those applied to said seven transducers 113-1, 113-2, . . . , 113-7.

FIGS. 21 to 24 show an embodiment of the control mechanism for controlling the electrothermal transducers in succession thereby causing droplet emission from the orifices in succession.

Figure 21:
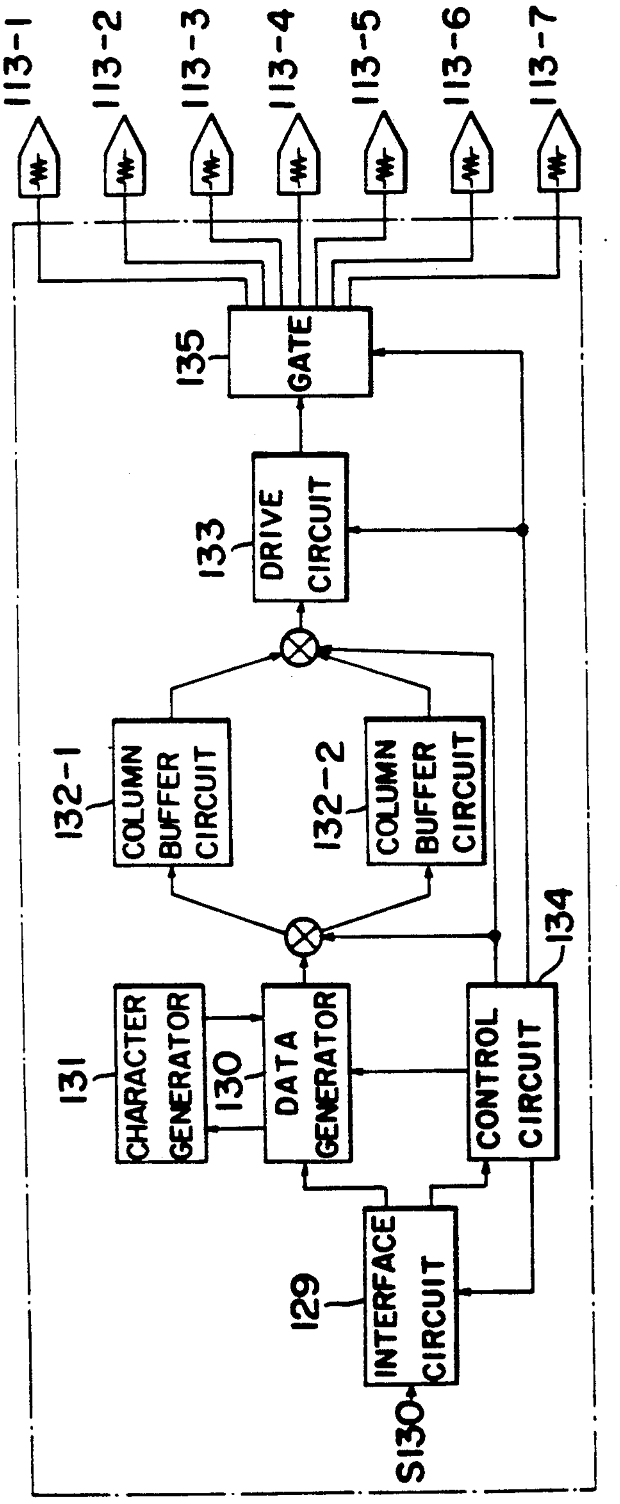
FIG. 21 is a block diagram showing another example of control mechanism for use in recording with a recording head shown in FIG. 11.

Referring to FIG. 21 showing a block diagram of the entire apparatus, external input signals S130 are supplied through an interface circuit 129 and rearranged in a data generator 130 into a form suitable for printing. In case of printing for each column as shown in FIG. 21, the data for each column are read from a character generator 131 and temporarily stored in a column buffer circuit 132. Simultaneously with the readout of column data from the character generator 131 and input thereof into a column buffer circuit 132-2, another column buffer circuit 132-1 releases another data to a drive circuit 133. A control circuit 134 is provided for releasing signals for selecting the buffer circuits 132, for controlling the input and output of other circuits and for instructing the functions of other circuits.

Figure 22:
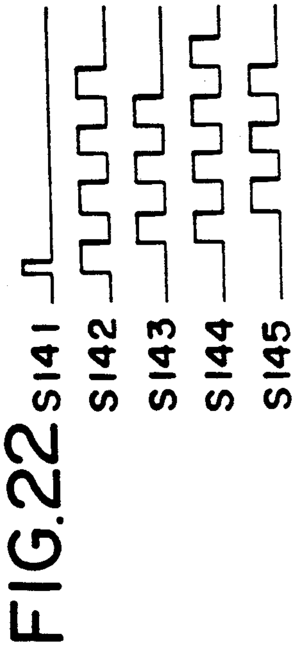
FIG. 22 is a timing chart showing the buffer function of a column buffer circuit shown in FIG. 21.
Figure 23:
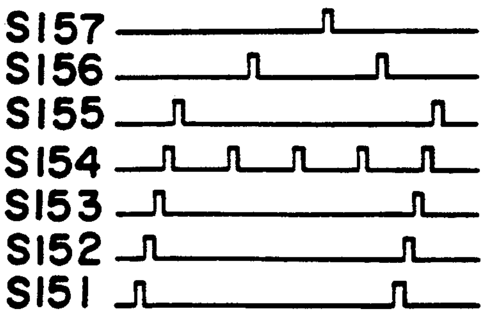
FIG. 23 is a timing chart showing an example of the timing of signals to be applied to the electro-thermal transducers in the case of FIG. 21.
Figure 24:
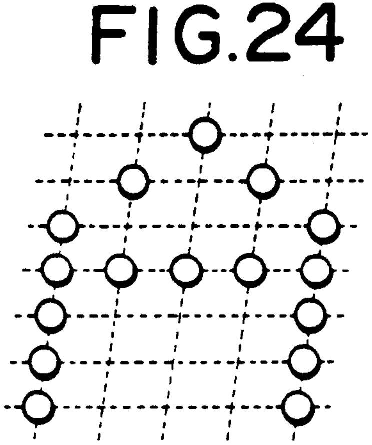
FIG. 24 is a view of an example of printing obtainable in the above-mentioned case.

FIG. 22 is a timing chart showing the function of said buffer circuits 132 and of the drive circuit 133 of which column data output signals are controlled by a gate circuit 135 so as to successively drive the transducers 113-1, 113-2, . . . , 113-7. In FIG. 22 there are shown character clock signals S141, input signals S142 to column buffer circuit 132-1, input signals S143 to column buffer circuit 132-2, output signals S144 from column buffer circuit 132-1 and output signals S145 from column buffer circuit 132-2. As the result the droplets are projected from seven orifices in succession according for example to the timing shown in FIG. 23 to obtain a printed character as shown in FIG. 24 wherein S151 to S157 respectively stand for signals applied to the transducers 113-1, 113-2, . . . , 113-7.

Although the foregoing explanation is limited to control on character printing, the control in case of reproducing an image is also possible in a similar manner. Also the foregoing explanation is made in connection with the use of a recording head having seven orifices, but a similar control is applicable in case of using a full-line multi-orificed recording head.

In the following, there is shown an example of recording with a recording head having seven orifices as shown in FIG. 11 and prepared in the manner as explained in the foregoing.

The above-mentioned recording head was incorporated in a recording apparatus provided with a liquid projection control circuit, and recording was conducted by applying pulse voltages to seven electrothermal transducers according to image signals while supplying the liquid recording medium through the pipe 109 under a pressure of a magnitude not causing emission of the liquid from the orifice 105 when the resistor 115 does not generate heat. In this manner a clear image could be obtained under the conditions shown in the following Tab. 1:

TAB. 1

| | | |
|---|---|---|
| Drive voltage | 20 V | |
| Pulse width | 100 μsec | |
| Frequency | 1 KHz | |
| Recording-receiving member | Bond paper (Seven Star A 28.5 Kg; Hokuetsu Paper) | |
| Liquid recording medium | Water | 68 gr |
| | Ethylene glycol | 30 gr |
| | Direct Fast Black | 2 gr |

TAB. 1-continued

| |
|---|
| (Sumitomo Chemical Ind.) |

As another example, recording was conducted with a similar apparatus by applying continuously repeating pulse voltages of 20 KHz to seven electrothermal transducers while supplying the liquid recording medium to the recording head 104 under a pressure of a magnitude causing overflow of the liquid from the orifice 105 when the resistor 115 was not generating heat. In this manner it was confirmed that droplets of a number corresponding to the applied frequency could be emitted stably with a uniform diameter.

From the foregoing examples it is confirmed that the recording head constituting a principal portion of the present invention is effectively applicable for generating continuous emission of droplets at a high frequency.

Other embodiments of the present invention

Example A

Figure 25:
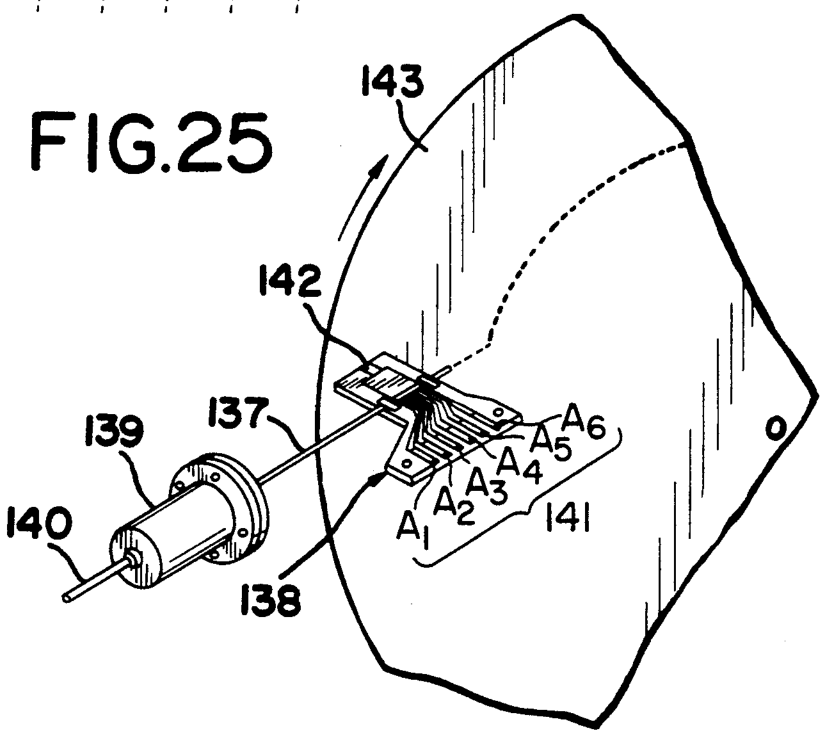
FIGS. 25 to 27 are schematic perspective views of still other embodiments of the recording apparatus of the present invention.

FIG. 25 schematically shows another embodiment of the apparatus of the present invention, in which a nozzle 137 is arranged in contact, at the front end thereof, with a heat-generating portion of an electrothermal transducer 138 and is connected at the other end thereof to a pump 139 for supplying a liquid recording medium into said nozzle 137. 140 is a pipe for supplying said liquid from a reservoir (not shown) to said pump 139. The electrothermal transducer 138 is provided, along the axis of nozzle 137, with six independent heat-generating resistors (not visible in the drawing as they are provided under the nozzle 137) in order to modify the position of application of thermal energy, said resistors being provided with selecting electrodes 141 (A1, A2, A3, A4, A5 and A6) and a common electrode 142. 143 is a drum for rotating a record-receiving member mounted thereon, the rotating speed of which is suitably synchronizable with the scanning speed of nozzle 137.

Recording was conducted with the above-explained apparatus, utilizing black 16-1000 (A. B. Dick) as the liquid recording medium and under the conditions shown in Tab. 2.

Also Tab. 3 shows the diameter of spot obtained on the record-receiving medium in such recording by activating each of said resistors in the electrothermal transducer 138. These results indicate that the spot diameter of the liquid obtained on the record-receiving medium can be varied by changing the position of the thermal energy on the nozzle 137.

Thus an image recording conducted in such a manner that either one of six heat-generating resistors is activated according to the input level of recording information signals provided a clear image of an excellent quality rich in gradation.

TAB. 2

| | |
|---|---|
| Orifice diameter | 100 μm |
| Nozzle scanning pitch | 100μ |
| Drum peripheral speed | 10 cm/sec |
| Signals to resistors | pulses of 15 V, 200 μsec |
| Drum-orifice distance | 2 cm |
| Record-receiving member | Ordinary paper |

TAB. 3

| | Resistor | | | | | |
|---|---|---|---|---|---|---|
| | A1 | A2 | A3 | A4 | A5 | A6 |
| Spot diameter (μm) | 200 ± 10 | 180 ± 12 | 160 ± 12 | 140 ± 12 | 120 ± 10 | 100 ± 10 |

Example B

Figure 26:
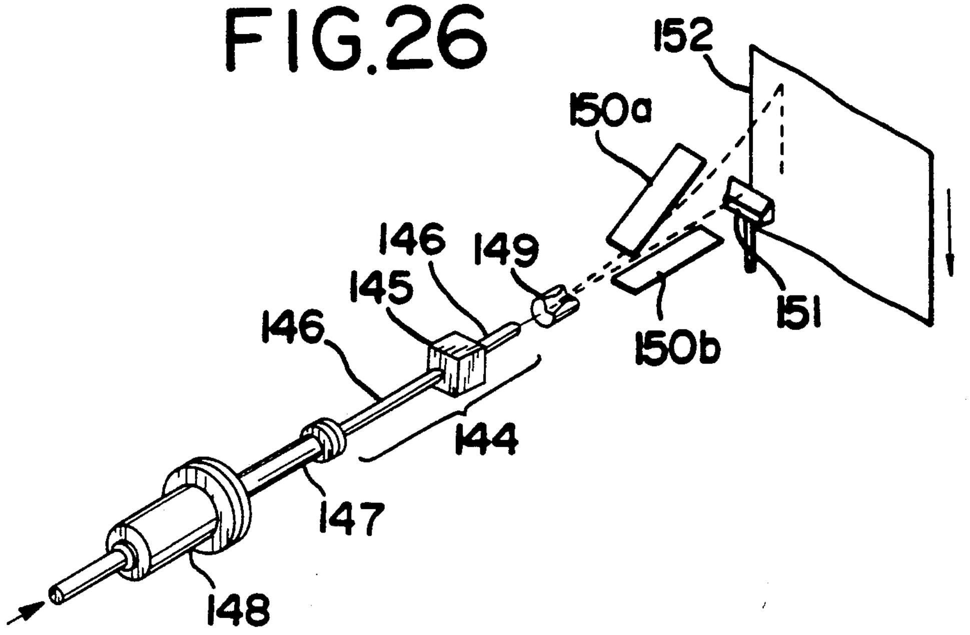

FIG. 26 schematically shows another embodiment of the apparatus of the present invention also providing a clear image printing, in which a recording head 144 is composed of a nozzle 146 having an orifice for emitting the liquid recording medium and an electrothermal transducer 145 provided surrounding a part of said nozzle 146. Said recording head 144 is connected, through a pipe joint 147, to a pump 148 for supplying the liquid recording medium to said nozzle 146, said medium being supplied to said pump 148 as shown by the arrow in the drawing.

There are also shown a charging electrode 149 for charging, according to the recording information signals, the droplets formed upon emission from the orifice, deflecting electrodes 150*a*, 150*b* for deflecting the direction of flight of thus charged droplets, a gutter 151 for recovering droplets not required for recording, and a record-receiving member 152.

Recording with the above-explained apparatus was conducted with Casio C.J.P. Ink (Casio Co.) and under the conditions shown in Tab. 4.

TAB. 4

| | |
|---|---|
| Orifice diameter | 50 μm |
| Signals to transducer | Constant pulses of 15 V, 200 μsec, 2 KHz |
| Charging electrode range | 0–200 V |
| Voltage between deflecting electrodes | 1 KV |
| Orifice-charging electrode distance | 4 mm |

Example C

Figure 27:
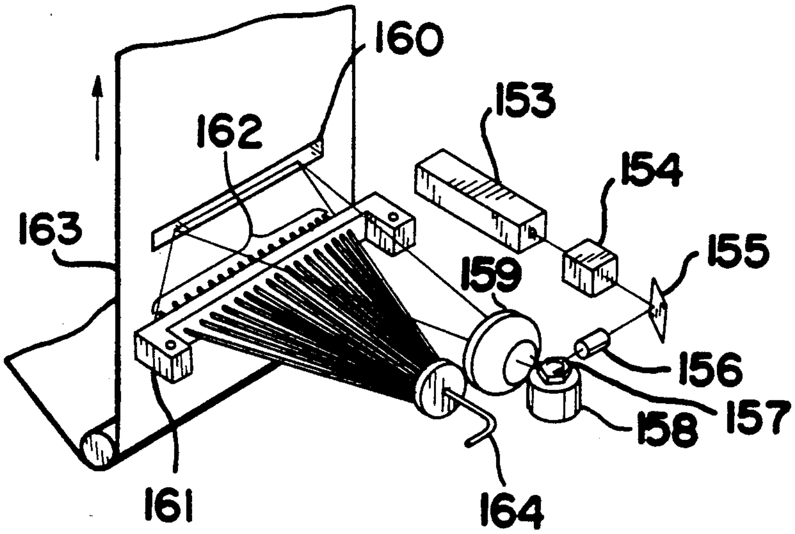

FIG. 27 schematically shows, in a perspective view, still another embodiment of the apparatus of the present invention, wherein a laser beam generated by a laser oscillator 153 is guided into an acousto-optical modulator 154 and is intensity modulated therein according to the input information signals. Thus modulated laser beam is deflected by a mirror 155 and is guided to a beam expander 156 for increasing the beam diameter while retaining the parallel beam state. The beam with thus increased diameter is then guided to a polygonal mirror 157 mounted on the shaft of a hysteresis synchronous motor 158 for rotation at a constant speed. The horizontally sweeping beam obtained from said polygonal mirror is focused, by means of an f-$\theta$ lens and via a mirror 160, onto a determined position on each of nozzles 162 aligned at the front end of a multi-orificed recording head 161. Thus focused laser beam provides thermal energy to the liquid recording medium contained in the thermal chamber portion of each nozzle thereby causing projection of droplets of said liquid from the nozzle orifices for achieving recording on a record-receiving member 163. Each of the nozzles in said recording head 161 receives supply of the liquid from a pipe 164. In the recording head 161 of the present example, the length of nozzles is 20 cm, the number of nozzles is 4/mm and the diameter of orifice is ca. 40 μ. The recording conditions employed are shown in Tab. 5, and the preparation of liquid recording medium is shown in the following.

TAB. 5

| | |
|---|---|
| Laser | YAG laser, 40 W |
| Laser scanning speed | 25 lines/sec |
| Record-receiving member | Ordinary paper; 10 cm/sec |

Preparation of liquid recording medium: 1 part by weight of an alcohol-soluble nigrosin dye (spirit Black SB; Orient Chemical) is dissolved in 4 parts by weight of ethylene glycol, and 60 parts by weight of thus obtained solution is poured under agitation into 94 parts by weight of water containing 0.1 wt % of Dioxin (trade name). The resulting solution is filtered twice through a Millipore filter of an average pore diameter of 10 μ to obtain an aqueous recording medium.

Example D

Figure 28:
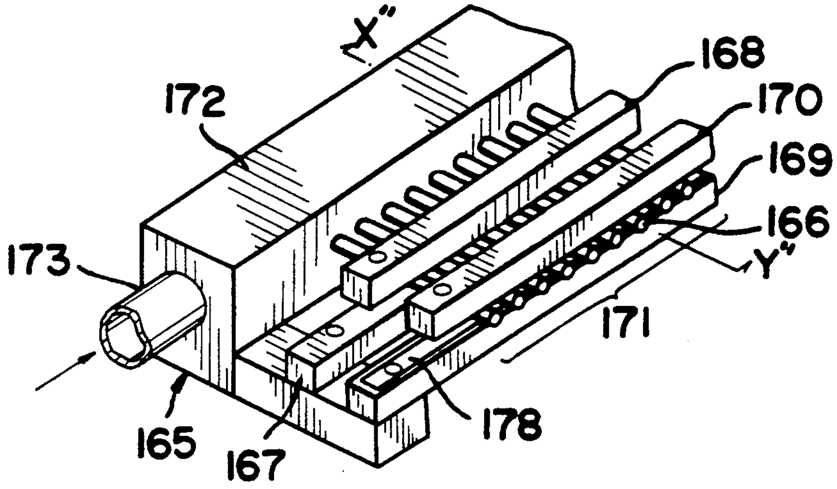
FIG. 28 is a partial perspective view of still another preferred embodiment of the recording head constituting a principal component in the present invention.

In this example image recording is conducted with a multi-orificed recording head 165 schematically shown in a partial perspective view in FIG. 28, wherein said recording head 165 comprises a number of nozzles 166 each having an orifice for emitting the liquid recording medium, said nozzles 166 being maintained in parallel state by support members 167, 168, 169 and 170 to form a nozzle array 171 and being connected to a common liquid supply chamber 172, to which the liquid is supplied through a pipe 173 as shown by the arrow in the drawing.

Figure 29:
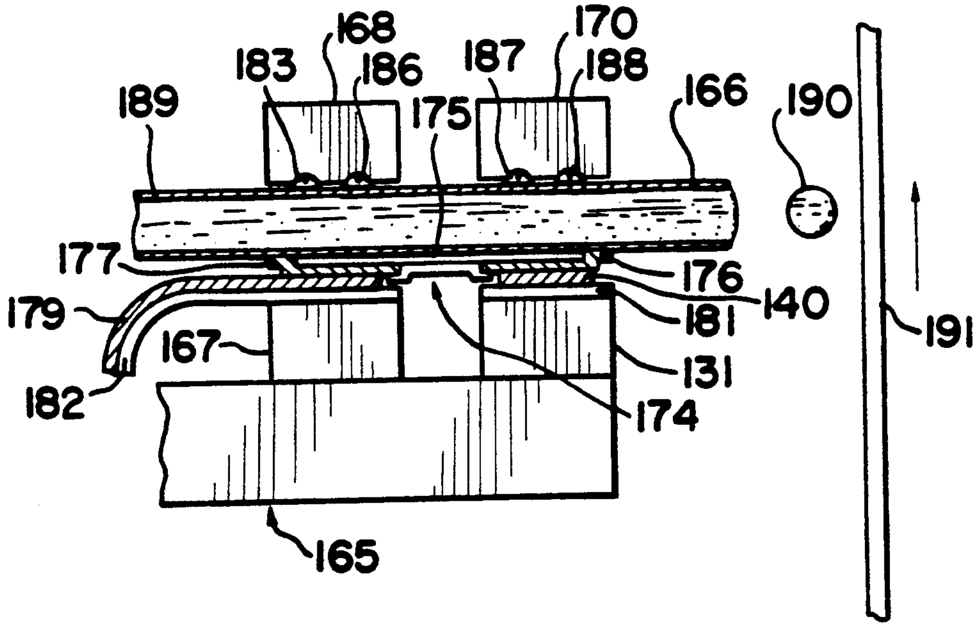
FIG. 29 is a cross-sectional view along the line X''-Y'' in FIG. 28.

Referring to FIG. 29 showing a partial cross section along the dotted line X″-Y″ in FIG. 28, each nozzle 166 is provided on the surface thereof with an independent electro-thermal transducer 174 which is composed of a heat-generating member 175 provided on the surface of nozzle 166, electrodes 176 and 177 provided on both ends of said heat-generating member 175, a lead electrode common to all the nozzles and connected to said electrode 176, a selecting lead electrode 179 connected to said electrode 177, and an anti-oxidation layer 180.

Also there are shown insulating sheets 181, 182, and rubber cushions 183, 185, 186 for preventing mechanical breakage of nozzles.

Upon receipt of signals corresponding to information to be recorded, the heat-generating member 175 of electro-thermal transducer 174 develops heat, which causes a state change in the liquid recording medium contained in the thermal chamber portion of nozzles 166 thereby causing projection of droplets of said liquid from the orifices of nozzles 166 for deposition onto a record-receiving member 191.

The apparatus of the present example provided under the conditions shown in Tab. 6, an extremely clear image of a satisfactory quality with an average spot diameter of ca. 60 μ.

TAB. 6

| | |
|---|---|
| Orifice diameter | 50 μm |
| Pitch of nozzles | 4/mm |
| Speed of record-receiving member | 50 cm/sec |
| Signals to transducers | Pulses of 15 V, 200 μsec |
| Orifice-member distance | 2 cm |
| Record-receiving member | Ordinary paper |
| Liquid recording medium | Casio C.J.P. Ink |

Also recorded images of an excellent quality can be obtained on ordinary paper with the liquid recording media of the following compositions (No. 5–No. 9);

| | | |
|---|---|---|
| No. 5 | | |
| Calcovd Black SR (American Cyanamid) | 4.0 | wt. % |
| Diethylene glycol | 7.0 | wt. % |
| Dioxin (Trade name) | 0.1 | wt. % |
| Water | 88.9 | wt. % |
| No. 6 | | |
| N-methyl-2-pyrrolidone | 20 | wt. % of |
| containing an alcohol-soluble nigrosin dye | 9 | wt. % |
| Polyethylene glycol | 16 | wt. % |
| Water | 75 | wt. % |
| No. 7 | | |
| Kayaku Direct Blue BE (Nippon Kayaku) | 4 | wt. % |
| Polyoxyethylene monopalmitate | 1 | wt. % |
| Polyethylene glycol | 8.0 | wt. % |
| Dioxin (trade name) | 0.1 | wt. % |
| Water | 86.9 | wt. % |
| No. 8 | | |
| Kayaset red 026 (Nippon Kayaku) | 5 | wt. % |
| Polyoxyethylene monopalmitate | 1 | wt. % |
| Polyethylene glycol | 5 | wt. % |
| Water | 89 | wt. % |
| No. 9 | | |
| C.I. Direct Black 40 (Sumitomo Chemical) | 2 | wt. % |
| Polyvinyl alcohol | 1 | wt. % |
| Isopropyl alcohol | 3 | wt. % |
| Water | 94 | wt. % |

Recording medium

The liquid recording medium to be employed in the present invention is required to be provided with, in addition to chemical and physical stability required for the recording liquids used in ordinary recording methods, other properties such as satisfactory response, fidelity and fiber-forming ability, absence of solidification in the nozzle, flowability in the nozzle at a speed corresponding to the recording speed, rapid fixation on the record-receiving member, sufficient record density, sufficient pot life etc.

In the present invention there can be employed any liquid recording medium as long as the above-mentioned requirements are satisfied, and most of the recording liquids conventionally used in the field of recording related to the present invention are effectively usable for this purpose.

Such liquid recording medium is composed of a carrier liquid, a recording material for forming the recorded image and additive materials eventually added for achieving desired properties, and can be classified into the categories of aqueous, non-aqueous, soluble, electro-conductive and insulating.

The carrier liquids are classified into aqueous solvents and non-aqueous solvents.

Most of the ordinarily known non-aqueous solvents are conveniently usable in the present invention. Examples of such non-aqueous solvents are alkylalcohols having 1 to 10 carbon atoms such as methyl alcohol, ethyl alcohol, n-propyl alcohol, iso-propyl alcohol, n-butyl alcohol, sec-butyl alcohol, tert-butyl alcohol, iso-butyl alcohol, amyl alcohol, hexyl alcohol, heptyl alcohol, octyl alcohol, nonyl alcohol, decyl alcohol etc; hydrocarbon solvents such as hexane, octane, cyclopentane, benzene, toluene, xylol etc.; halogenated hydrocarbon solvents such as carbon tetrachloride, trichloroethylene, tetrachloroethane, dichlorobenzene etc.; ether solvents such as ethylether, butylether, ethylene glycol diethylether, ethylene glycol monoethylether etc; ketone solvents such as acetone, methylethylketone, methylpropylketone, methylamylketone, cyclohexanone etc.; ester solvents such as ethyl formate, methyl acetate, propyl acetate, phenyl acetate, ethylene glycol monoethylether acetate etc.; alcohol solvents such as diacetone alcohol etc.; and high-boiling hydrocarbon solvents.

The above-mentioned carrier liquids are suitably selected in consideration of the affinity with the recording material and other additives to be employed and in order to satisfy the foregoing requirements, and may also be used as a mixture of two or more solvents or a mixture with water, if necessary and within a limit that a desirable recording medium is obtainable.

Among the carrier liquids mentioned above, preferred are water and water-alcohol mixtures in consideration of ecology, availability and ease of preparation.

The recording material has to be selected in relation to the above-mentioned carrier liquid and to the additive materials so as to prevent sedimentation or coagulation in the nozzles and reservoir and clogging of pipes and orifices after a prolonged standing. In the present invention preferred, therefore, is the use of recording materials soluble in the carrier liquid, but those not soluble or soluble with difficulty in the carrier liquid are also usable in the present invention as long as the size of dispersed particles is satisfactorily small.

The recording material to be employed in the present invention is to be suitably selected according to the record-receiving member and other recording conditions to be used in the recording, and various conventionally known dyes and pigments are effectively usable for this purpose.

The dyes effectively employable in the present invention are those capable of satisfying the foregoing requirements for the prepared recording medium and include water-soluble dyes such as direct dyes, basic dyes, acid dyes, solubilized vat dyes, acid mordant dyes and mordant dyes; and water-insoluble dyes such as sulphur dyes, vat dyes, spirit dyes, oil dyes and disperse dyes; and other dyes such as styrene dyes, naphthol dyes, reactive dyes, chrome dyes, 1:2 complex dyes, 1:1 complex dyes, azoic dyes, cationic dyes etc.

Preferred examples of such dyes are Resolin Brilliant Blue PRL, Resolin Yellow PGG, Resolin Pink PRR, Resolin Green PB (above available from Farbefabriken Bayer A. G.); Sumikaron Blue S-BG, Sumikaron Red E-EBL, Sumikaron Yellow E-4GL, Sumikaron Brilliant Blue S-BL (above from Sumitomo Chemical Co., Ltd.); Dianix Yellow HG-SE, Dianix Red BN-SE (above from Mitsubishi Chemical Industries Limited); Kayalon Polyester Light Flavin 4GL, Kayalon Polyester Blue 3R-SF, Kayalon Polyester Yellow YL-SE, Kayaset Turquoise Blue 776, Kayaset Yellow 902, Kayaset Red 026, Procion Red H-2B, Procion Blue H-3R (above from Nippon Kayaku); Levafix Golden Yellow P-R, Levafix Brilliant Red P-B, Levafix Brilliant Orange P-GR (above from Farbenfabriken Bayer A. G.); Sumifix Yellow GRS, Sumifix Red B, Sumifix Brilliant Red BS, Sumifix Brilliant Blue RB, Direct Black 40 (above from Sumitomo Chemical); Diamira Brown 3G, Diamira Yellow G, Diamira Blue 3R, Diamira Brilliant Blue B, Diamira Brilliant Red BB (above from Mitsubishi Chemical Industries); Remazol Red B, Remazol Blue 3R, Remazol Yellow GNL, Remazol Brilliant Green 6B (above from Farbwerke Hoechst A. G.); Cibacron Brilliant Yellow, Cibacron Brilliant Red 4GE (above from Ciba Geigy); Indigo, Direct Deep Black E-Ex, Diamin Black BH, Congo Red, Sirius Black, Orange II, Amid Black 10B, Orange RO, Metanil Yellow, Victoria Scarlet, Nigrosine, Diamond Black PBB (above from I. G. Farbenindustrie A. G.); Diacid Blue 3G, Diacid Fast Green GW, Diacid Milling Navy Blue R, Indanthrene (above from Mitsubishi Chemical Industries); Zabon dye (from BASF); Oleosol dyes (from CIBA); Lanasyn dyes (Mitsubishi Chemical Industries); Diacryl Orange RL-E, Diacryl Brilliant Blue 2B-E, Diacryl Turquoise Blue BG-E (above from Mitsubishi Chemical Industries) etc.

These dyes are used in a form of solution or dispersion in a carrier liquid suitably selected according to the purpose.

The pigments effectively employable in the present invention include various inorganic and organic pigments, and preferred are those of an elevated infrared absorbing efficiency in case infrared light is used as the source of thermal energy. Examples of such inorganic pigment include cadmium sulfide, sulfur, selenium, zinc sulfide, cadmium sulfoselenide, chrome yellow, zinc chromate, molybdenum red, guignet's green, titanium dioxide, zinc oxide, red iron oxide, green chromium oxide, red lead, cobalt oxide, barium titanate, titanium yellow, black iron oxide, iron blue, litharge, cadmium red, silver sulfide, lead sulfide, barium sulfate, ultramarine, calcium carbonate, magnesium carbonate, white lead, cobalt violet, cobalt blue, emerald green, carbon black etc.

Organic pigments are mostly classified as and thus overlap organic dyes, but preferred examples of such organic pigments effectively usable in the present invention are as follows:

a) Insoluble azo-pigments (naphthols)

Brilliant Carmine BS, Lake Carmine FB, Brilliant Fast Scarlet, Lake Red 4R, Para red, Permanent Red R, Fast Red FGR, Lake Bordeaux 5B, Bar Million No. 1, Bar Million No. 2, Toluidine Maroon;

b) Insoluble azo-pigments (anilids)

Diazo Yellow, Fast Yellow G, Fast Yellow 100, Diazo Orange, Vulcan Orange, Ryrazolon Red;

c) Soluble azo-pigments

Lake Orange, Brilliant Carmine 3B, Brilliant Carmine 6B, Brilliant Scarlet G, Lake Red C, Lake Red D, Lake Red R, Watchung Red, Lake Bordeaux 10B, Bon Maroon L, Bon Maroon M;

d) Phthalocyanine pigments

Phthalocyanine Blue, Fast Sky Blue, Phthalocyanine Green;

e) Lake Pigments

Yellow Lake, Eosine Lake, Rose Lake, Violet Lake, Blue Lake, Green Lake, Sepia Lake;

f) Mordant dyes

Alizatine Lake, Madder Carmine;

g) Vat dyes

Indanthrene, Fast Blue Lake (GGS);

h) Basic dye Lakes

Rhodamine Lake, Malachite Green Lake;

i) Acid dye Lakes

Fast Sky Blue, Quinoline Yellow Lake, quinacridone pigments, dioxazine pigments.

The ratio of the above-mentioned carrier liquid and recording material to be employed in the present invention is determined in consideration of eventual nozzle clogging, eventual drying of recording liquid in the nozzle, clogging on the record-receiving member, drying speed thereon etc., and is generally selected within a range, with respect to 100 parts by weight of carrier liquid, of 1 to 50 parts by weight of recording material, preferably 3 to 30 parts by weight, and most preferably 5 to 10 parts by weight of recording material.

In case the liquid recording medium consists of a dispersion wherein the particles of recording material are dispersed in the carrier liquid, the particle size of said dispersed recording material is suitably determined in consideration of the species of recording material, recording conditions, internal diameter of nozzle, diameter of orifice, species of record-receiving member etc. However an excessively large particle size is not desirable as it may result in sedimentation of recording material during storage leading to uneven concentration, nozzle clogging or uneven density in the recorded image.

In order to avoid such troubles the particle size of recording material in a dispersed recording medium to be employed in the present invention is generally selected within a range from 0.0001 to 30 $\mu$, preferably from 0.0001 to 20 $\mu$ and most preferably from 0.0001 to 8 $\mu$. Besides the extent of particle size distribution of such dispersed recording material is to be as narrow as possible, and is generally selected within a range of $D \pm 3\ \mu$, preferably within a range of $D \pm 1.5\ \mu$, wherein D stands for the average particle size.

The liquid recording medium for use in the present invention is essentially composed of the carrier liquid and the recording materials as explained in the foregoing, but it may further contain other additive materials for realizing or improving the aforementioned properties required for recording.

Such additive materials include viscosity regulating agents, surface tension regulating agents, pH regulating agents, resistivity regulating agents, wetting agents, infrared-absorbing heat-generating agents etc.

Such viscosity regulating agent and surface tension regulating agent are added principally for achieving a flowability in the nozzle at a speed sufficiently responding to the recording speed, for preventing dropping of recording medium from the orifice of nozzle to the external surface thereof, and for blotting (widening of spot) on the record-receiving member.

For these purposes any known viscosity regulating agent or surface tension regulating agent is applicable as long as it does not provide undesirable effect to the carrier liquid and recording material.

Examples of such viscosity regulating agent are polyvinyl alcohol, hydroxypropylcellulose, carboxymethyl cellulose, hydroxyethyl cellulose, methyl cellulose, water-soluble acrylic resins, polyvinylpyrrolidone, gum Arabic, starch etc.

The surface tension regulating agents effectively usable in the present invention include anionic, cationic and nonionic surface active agents, such as polyethyleneglycolether sulfate, ester salt etc. as the anionic compound, poly-2-vinylpyridine derivatives, poly-4-vinylpyridine derivatives etc. as the cationic compound, and polyoxyethylenealkylether, polyoxyethylenealkylphenylether, polyoxyethylenealkyl esters, polyoxyethylenesorbitan alkylester, polyoxyethylene alkylamines etc. as the nonionic compound. In addition to the above-mentioned surface active agents, there can be effectively employed other materials such as amine acids such as diethanolamine, propanolamine, morphole etc., basic compounds such as ammonium hydroxide, sodium hydroxide etc., and substituted pyrrolidones such as N-methyl-2-pyrrolidone etc.

These surface tension regulating agents may also be employed as a mixture of two or more compounds so as to obtain a desired surface tension in the prepared recording medium and within a limit that they do not undesirably affect each other or affect other constituents.

The amount of said surface tension regulating agents is determined suitably according to the species thereof, species of other constituents and desired recording characteristics, and is generally selected, with respect to 1 part by weight of recording medium, in a range from 0.0001 to 0.1 parts by weight, preferably from 0.001 to 0.01 parts by weight.

The pH regulating agent is added in a suitable amount to achieve a determined pH value thereby improving the chemical stability of prepared recording medium, thus avoiding changes in physical properties and avoiding sedimentation or coagulation of recording material or other components during a prolonged storage.

As the pH regulating agent adapted for use in the present invention, there can be employed almost any materials capable of achieving a desired pH value without giving undesirable effects to the prepared liquid recording medium.

Examples of such pH regulating agent are lower alkanolamine, monovalent hydroxides such as alkali metal hydroxide, ammonium hydroxide etc.

Said pH regulating agent is added in an amount required for realizing a desired pH value in the prepared recording medium.

In case the recording is achieved by charging the droplets of liquid recording medium, the resistivity thereof is an important factor for determining the charging characteristics. In order that the droplets can be charged for achieving a satisfactory recording, the liquid recording medium is to be provided with a resistivity generally within a range of $10^{-3}$ to $10^{11}$ Ωcm.

Examples of resistivity regulating agent to be added in a suitable amount to achieve the resistivity as explained above in the liquid recording medium are inorganic salts such as ammonium chloride, sodium chloride, potassium chloride etc., water-soluble amines such as triethanolamine etc., and quaternary ammonium salts.

In case of recording wherein the droplets are not charged, the resistivity of recording medium need not be controlled.

As the wetting agent adapted for use in the present invention there can be employed various materials known in the technical field related to the present invention, among which preferred are those thermally stable. Examples of such wetting agent are polyalkylene glycols such as polyethylene glycol, polypropylene glycol etc.; alkylene glycols containing 2 to 6 carbon atoms such as ethylene glycol, propylene glycol, butylene glycol, hexylene glycol etc.; lower alkyl ethers of diethylene glycol such as ethyleneglycol methylether, diethyleneglycol methylether, diethyleneglycol ethylether etc.; glycerin; lower alcoxy triglycols such as methoxy triglycol, ethoxy triglycol etc.; N-vinyl-2-pyrrolidone oligomers etc.

Such wetting agents are added in an amount required for achieving desired properties in the recording medium, and are generally added within a range from 0.1 to 10 wt. %, preferably 0.1 to 8 wt. % and most preferably 0.2 to 7 wt. % with respect to the entire weight of the liquid recording medium.

The above-mentioned wetting agents may be used, in addition to single use, as a mixture of two or more compounds as long as they do not undesirably affect each other.

In addition to the foregoing additive materials the liquid recording medium of the present invention may further contain resinous polymers such as alkyd resin, acrylic resin, acrylamide resin, polyvinyl alcohol, polyvinylpyrrolidone etc. in order to improve the film forming property and coating strength of the recording medium when it is deposited on the record-receiving member.

In case of using laser energy, particularly infrared laser energy, it is desirable to add an infrared-absorbing heat-generating material into the liquid recording medium in order to improve the effect of laser energy. Such infrared-absorbing materials are mostly in the family of the aforementioned recording materials and are preferably dyes or pigments showing a strong infrared absorption. Examples of such dyes are water-soluble nigrosin dyes, denatured water-soluble nigrosin dyes, alcohol-soluble nigrosin dyes which can be rendered water-soluble etc., while the examples of such pigments include inorganic pigments such as carbon black, ultramarine blue, cadmium yellow, red iron oxide, chrome yellow etc., and organic pigments such as azo pigments, triphenylmethane pigments, quinoline pigments, anthraquinone pigments, phthalocyanine pigments etc.

In the present invention the amount of such infrared absorbing heat-generating material, in case it is used in addition to the recording material, is generally selected within a range of 0.01 to 10 wt. %, preferably 0.1 to 5 wt. % with respect to the entire weight of the liquid recording medium.

Said amount should be maintained at a minimum necessary level particularly when such infrared-absorbing material is insoluble in the carrier liquid, as it may result in sedimentation, coagulation or nozzle clogging for example during the storage of liquid recording medium, though the extent of such phenomena is dependent on the particle size in the dispersion.

As explained in the foregoing, the liquid recording medium to be employed in the present invention is to be prepared in such a manner that the values of specific heat, thermal expansion coefficient, thermal conductivity, viscosity, surface tension, pH and resistivity, in case the droplets are charged at recording, are situated within the respectively defined ranges in order to achieve the recording characteristics described in the foregoing.

In fact these properties are closely related to the stability of fiber-forming phenomenon, response and fidelity to the effect of thermal energy, image density, chemical stability, fluidity in the nozzle etc., so that in the present invention it is necessary to pay sufficient attention to these factors at the preparation of the liquid recording medium.

The following Tab. 7 shows the preferable ranges of physical properties to be satisfied by the liquid recording medium in order that it can be effectively usable in the present invention. It is to be noted, however, that the recording medium need not necessarily satisfy all these conditions but is only required to satisfy a part of these conditions shown in Tab. 7 according to the recording characteristics required. Nevertheless the conditions for the specific heat, thermal expansion coefficient and thermal conductivity shown in Tab. 7 should be met by all the recording media. Also it is to be understood that the more conditions are met by the recording medium the better the recording is.

TAB. 7

| Property (unit) | General range | Preferred range | Most Preferred range |
|---|---|---|---|
| Specific heat (J/°K.) | 0.1–4.0 | 0.5–2.5 | 0.7–2.0 |
| Thermal expansion coefficient ($\times 10^{-3}$ deg$^{-1}$) | 0.8–1.8 | 0.5–1.5 | |
| Viscosity (centipoise; 20° C.) | 0.3–3.0 | 1–20 | 1–10 |
| Thermal conductivity ($\times 10^{-3}$ W/cm.deg) | 0.1–50 | 1–10 | |
| Surface tension (dyne/cm) | 10–85 | 10–60 | 15–50 |
| pH | 6–12 | 8–11 | |
| Resistivity (Ωcm)* | $10^{-3}$–$10^{11}$ | $10^{-2}$–$10^{9}$ | |

*Applicable when the droplets are charged at the recording.

While we have shown and described certain present preferred embodiments of the invention it is to be distinctly understood that the invention is not limited thereto but may be otherwise variously embodied within the scope of the following claims.

What we claim is:

1. A recording apparatus comprising:

a photosensor for sensing an image;

an orifice for projecting droplets of liquid;

an inlet for accepting liquid for delivery to said orifice;

a liquid flow path from said inlet to said orifice;

heating means for heating liquid in said liquid flow path, in response to signals representing the image received from the photosensor, to generate bubbles in said liquid flow path and project droplets of liquid from said orifice by raising the temperature of the heating means at each actuation thereof to a temperature above the maximum temperature at which the liquid in said liquid flow path is subjected only to nucleate boiling, wherein the liquid in said liquid flow path is heated so as to promote substantially instantaneous transfer of heat to the liquid in said liquid flow path substantially proximate to said heating means and to retard the transfer of heat from said heating means to liquid at other locations in said liquid flow path; and means for supplying liquid to said inlet and along said liquid flow path to a portion thereof where liquid is heated by said heating means.

* * * * *

UNITED STATES PATENT AND TRADEMARK OFFICE

CERTIFICATE OF CORRECTION

PATENT NO. : 5,159,349

DATED : October 27, 1992

INVENTOR(S) : ICHIRO ENDO ET AL.

It is certified that error appears in the above-indentified patent and that said Letters Patent is hereby corrected as shown below:

On the title page:

AT [*] Notice

"July 18, 2006" should read --February 2, 2005--.

COLUMN 2

Line 13, "abovementioned" should read --above-mentioned--.

COLUMN 16

Line 60, "highspeed" should read --high-speed--.

COLUMN 17

Line 9, "a*p1785Xtechni-" should read --a techni- --.

Signed and Sealed this

Twenty-fifth Day of January, 1994

Attest:

BRUCE LEHMAN

Attesting Officer

Commissioner of Patents and Trademarks